United States Patent
Bailey

(10) Patent No.: US 11,719,363 B2
(45) Date of Patent: Aug. 8, 2023

(54) ADJUSTABLE CLAMP SYSTEMS

(71) Applicant: The Boeing Company, Chicago, IL (US)

(72) Inventor: Michael Wallace Bailey, Huntsville, AL (US)

(73) Assignee: The Boeing Company, Chicago, IL (US)

( * ) Notice: Subject to any disclaimer, the term of this patent is extended or adjusted under 35 U.S.C. 154(b) by 32 days.

(21) Appl. No.: 17/218,089

(22) Filed: Mar. 30, 2021

(65) Prior Publication Data

US 2021/0215275 A1    Jul. 15, 2021

Related U.S. Application Data

(62) Division of application No. 16/239,487, filed on Jan. 3, 2019, now Pat. No. 10,989,333.

(51) Int. Cl.
*F16L 3/10* (2006.01)
*F16L 55/035* (2006.01)

(52) U.S. Cl.
CPC .......... *F16L 3/1091* (2013.01); *F16L 55/035* (2013.01)

(58) Field of Classification Search
CPC .............................. F16L 3/1091; F16L 55/035
See application file for complete search history.

(56) References Cited

U.S. PATENT DOCUMENTS

| | | |
|---|---|---|
| 2,790,614 A | 4/1957 | Miller |
| 5,382,043 A | 1/1995 | Jordan |
| 6,126,119 A | 10/2000 | Giangrasso |
| 6,503,039 B2 | 1/2003 | Ward |
| 7,946,038 B2 | 5/2011 | Carns et al. |
| 8,662,461 B2 | 3/2014 | Mori |
| 8,746,632 B2 | 6/2014 | Walraven et al. |

(Continued)

FOREIGN PATENT DOCUMENTS

| | | |
|---|---|---|
| CN | 103358848 A | 10/2013 |
| CN | 107923425 A | 4/2018 |

(Continued)

OTHER PUBLICATIONS

Extended European Search Report prepared by the European Patent Office in application No. EP 19 21 7354.0 dated Jun. 9, 2020.

*Primary Examiner* — Anita M King
(74) *Attorney, Agent, or Firm* — McDonnell Boehnen Hulbert & Berghoff LLP

(57) ABSTRACT

In an example, an adjustable clamp system includes a base, a clamp assembly, and a first eccentric bushing. The base includes an anchor portion configured to couple the base to a support structure, a first clamp-support portion extending from the anchor portion, and a second clamp-support portion extending from the anchor portion. The clamp assembly includes a clamp defining a bore, a first flange extending from a first side of the clamp and coupled to the first clamp-support portion, and a second flange extending from a second side of the clamp and coupled to the second clamp-support portion. The first eccentric bushing couples the first flange to the first clamp-support portion. The first eccentric bushing is rotatable relative to the first flange to translate the clamp assembly in a first direction relative to the base and adjust a distance between the clamp and the anchor portion of the base.

20 Claims, 29 Drawing Sheets

(56) References Cited

U.S. PATENT DOCUMENTS

| | | | |
|---|---|---|---|
| 9,739,398 B2 | 8/2017 | Costa | |
| 2003/0191468 A1* | 10/2003 | Hoffman | A61B 17/6466 606/59 |
| 2009/0293256 A1* | 12/2009 | Carns | F16L 3/1226 29/428 |

FOREIGN PATENT DOCUMENTS

| | | |
|---|---|---|
| CN | 106 015 754 | 7/2018 |
| DE | 299 01 583 | 5/1999 |
| EP | 1 731 814 | 12/2006 |

\* cited by examiner

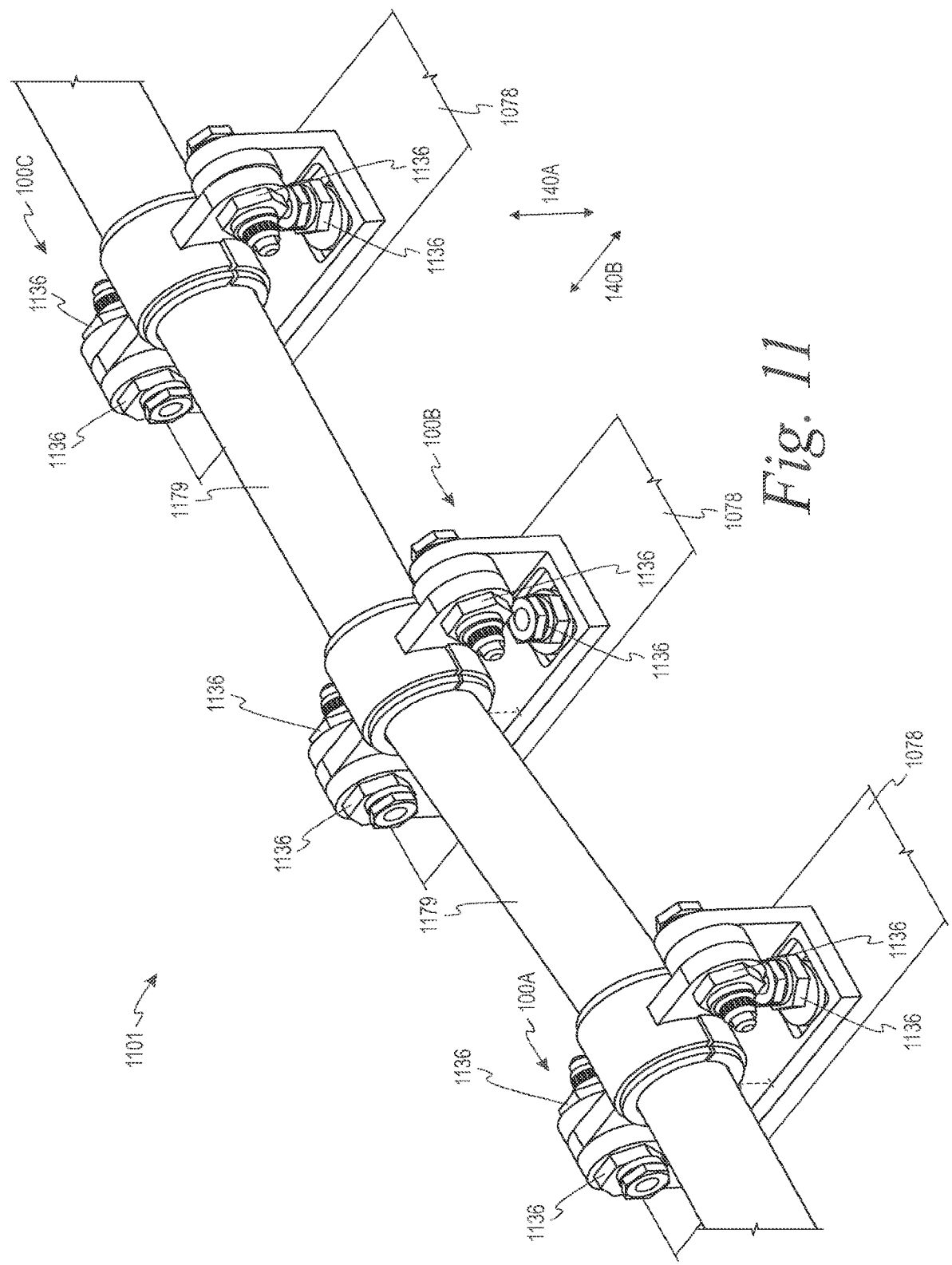

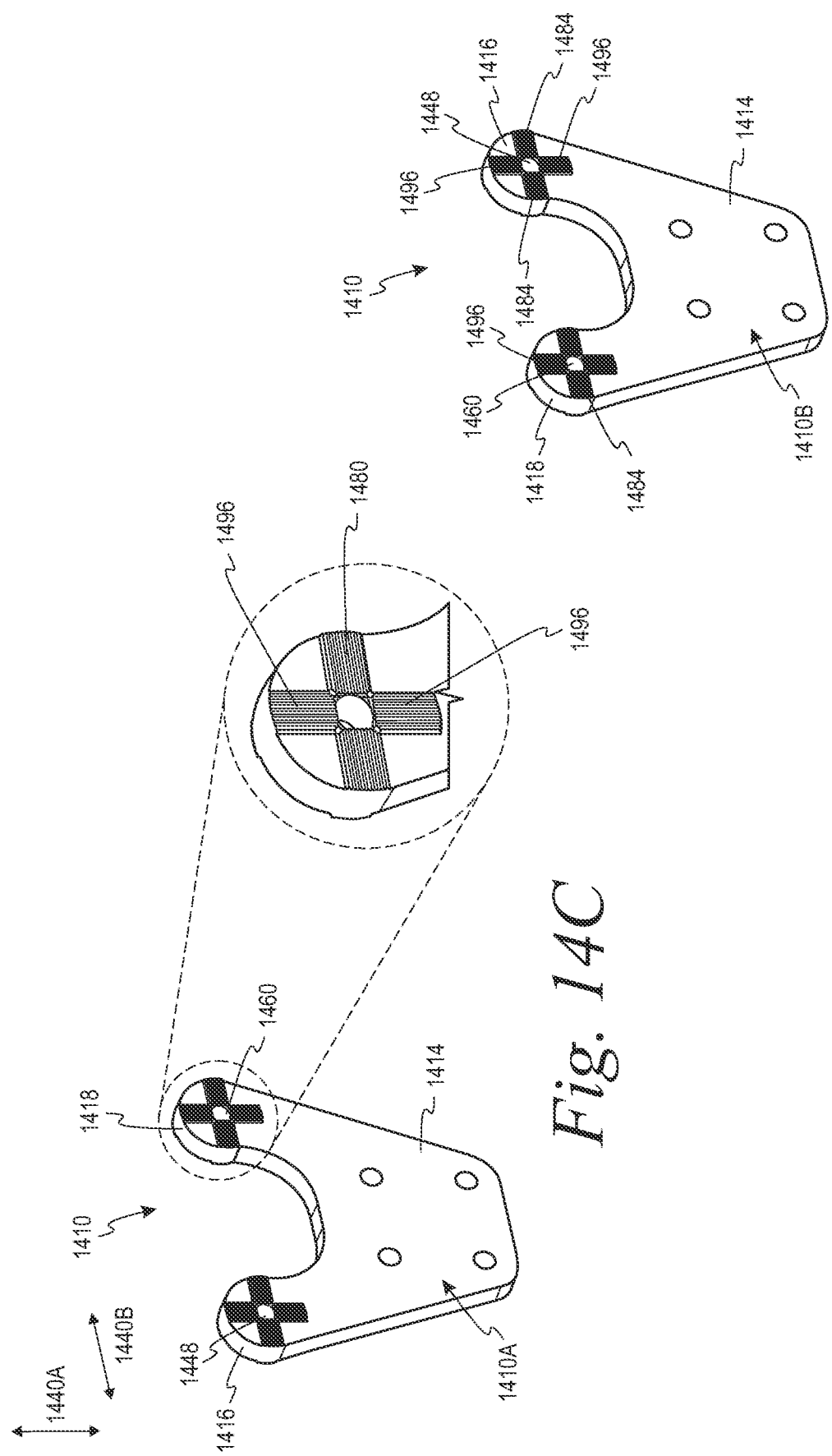

ADJUSTABLE CLAMP SYSTEMS

CROSS-REFERENCE TO RELATED APPLICATIONS

This application is a divisional of U.S. patent application Ser. No. 16/239,487, filed Jan. 3, 2019, the contents of which is hereby incorporated by reference in its entirety.

STATEMENT OF GOVERNMENTAL INTEREST

The invention described herein was made in the performance of work under NASA Contract. No. NNM07AB03C and is subject to the provisions of Section 305 of the National Aeronautics and Space Act of 1958 (72 Stat. 435; 42 U.S.C. 2457.).

FIELD

The present disclosure generally relates to systems and methods for clamps, and more particularly to systems and methods for adjustable clamp systems and methods.

BACKGROUND

A clamp system may be used to support elongated structures such as, for instance, tubing, ducts, and lines associated with electric, hydraulic, fuel, and other systems. In general, the clamp system may include one or more clamps that couple the elongated structure to a support structure. In this way, the clamp system can secure the elongated structure at a fixed position within an environment. This may help to route the elongated structure within the environment and/or mitigate vibrational damage to the elongated structures.

SUMMARY

In an example, an adjustable clamp system is described. The adjustable clamp system includes a base and a clamp assembly. The base includes an anchor portion configured to couple the base to a support structure, a first clamp-support portion extending from the anchor portion, and a second clamp-support portion extending from the anchor portion. The clamp assembly includes a clamp defining a bore, a first flange extending from a first side of the clamp and coupled to the first clamp-support portion of the base, and a second flange extending from a second side of the clamp and coupled to the second clamp-support portion of the base. The adjustable clamp system also includes a first eccentric bushing coupling the first flange of the clamp assembly to the first clamp-support portion of the base. The first eccentric bushing is rotatable relative to the first flange to translate the clamp assembly in a first direction relative to the base and adjust a distance between the clamp and the anchor portion of the base.

In another example, a method of coupling a tube to a support structure is described. The method includes coupling an anchor portion of a base to a support structure, and coupling a clamp assembly to the base. The clamp assembly includes (i) a clamp defining a bore, (ii) a first flange extending from a first side of the clamp, and (iii) a second flange extending from a second side of the clamp. Coupling the clamp assembly to the base includes coupling the first flange of the clamp assembly to a first clamp-support portion extending from anchor portion of the base, and coupling the second flange of the clamp assembly to a second clamp-support portion extending from anchor portion of the base. The method also includes coupling, in the bore, a tube to the clamp of the clamp assembly. The method further includes rotating a first eccentric bushing and a second eccentric bushing relative to the clamp assembly to translate the clamp assembly in a first direction relative to the base and adjust a distance between the clamp and the anchor portion of the base.

In another example, an adjustable clamp system is described. The adjustable clamp system includes a base, a clamp assembly, and a plurality of fasteners. The base includes an anchor portion configured to couple the base to a support structure, a first clamp-support portion extending from the anchor portion, a second clamp-support portion extending from the anchor portion, and a plurality of first serrations on the first clamp-support portion and the second clamp-support portion. The clamp assembly includes a clamp defining a bore, a first flange extending from a first side of the clamp, a second flange extending from a second side of the clamp, and a plurality of second serrations on the first flange and the second flange.

The plurality of fasteners are configured to couple, in a first state and a second state, (i) the first flange of the clamp assembly to the first clamp-support portion of the base and (ii) the second flange of the clamp assembly to the second clamp-support portion of the base. In the first state, the clamp assembly is translatable in a first direction relative to the base to provide for selection, from among a plurality of positions, of a position of the clamp assembly relative to the base. In the second state, the plurality of second serrations engage the plurality of first serrations to retain the clamp assembly at the position selected from among the plurality of positions. The plurality of positions are defined by the plurality of first serrations and the plurality of second serrations.

The features, functions, and advantages that have been discussed can be achieved independently in various embodiments or may be combined in yet other embodiments further details of which can be seen with reference to the following description and drawings.

BRIEF DESCRIPTION OF THE FIGURES

The novel features believed characteristic of the illustrative embodiments are set forth in the appended claims. The illustrative embodiments, however, as well as a preferred mode of use, further objectives and descriptions thereof, will best be understood by reference to the following detailed description of an illustrative embodiment of the present disclosure when read in conjunction with the accompanying drawings, wherein:

FIG. 11 illustrates a plurality of adjustable clamp systems coupling a tube to a support structure, according to an example embodiment.

FIG. 14C illustrates a perspective view of a base of the adjustable clamp system shown in FIG. 14A, according to an example embodiment.

FIG. 14D illustrates another perspective view of the base of the adjustable clamp system shown in FIG. 14A, according to an example embodiment.

DETAILED DESCRIPTION

Figure 1:
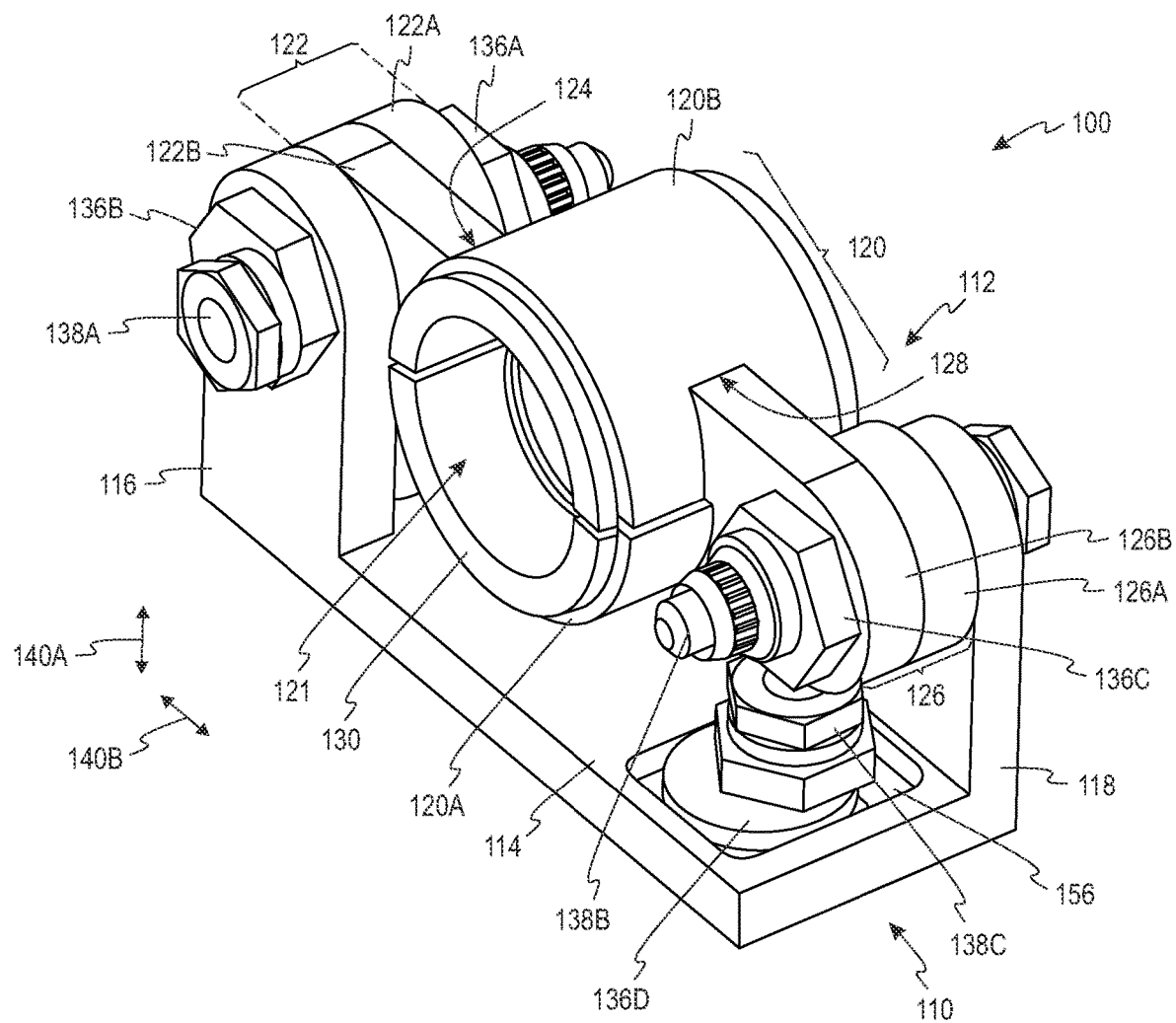
FIG. 1 illustrates a perspective view of an adjustable clamp system, according to an example embodiment.

Disclosed embodiments will now be described more fully hereinafter with reference to the accompanying drawings, in which some, but not all of the disclosed embodiments are shown. Indeed, several different embodiments may be described and should not be construed as limited to the embodiments set forth herein. Rather, these embodiments are described so that this disclosure will be thorough and complete and will fully convey the scope of the disclosure to those skilled in the art.

As noted above, a clamp system may be used to couple a tube to a support structure. In some instances, it may be challenging to align multiple clamps with each other when coupling the tube to the clamps. For example, the dimensions of the tube and/or the positioning of the tube relative to the support structure may vary due to manufacturing tolerances and/or structural features of an environment in which the tube is located. One approach to aligning multiple clamps is to use match drilling techniques when coupling the clamps to the support structure. However, matching drill processes can be relatively time consuming and inefficient.

Example systems and methods described herein can beneficially address at least some drawbacks of existing clamp systems. For instance, within examples, an adjustable clamp system can include a base for coupling with a support structure, and a clamp assembly coupled to the base. Within examples, the adjustable clamp system can include one or more eccentric bushings and/or serrations that provide for adjusting at least one of (i) a distance between a clamp of the clamp assembly and the base, (ii) a size of a bore defined by the clamp of the clamp assembly, and/or (iii) a lateral position of the clamp assembly relative to the support structure. By providing for such adjustability, the adjustable clamp system can be more efficiently adjusted to account for variations in tube dimensions and/or variations in features of the support structure.

Additionally, for instance, the adjustability of adjustable clamp systems can provide for the adjustable clamp system to be coupled to the support structure without matching drilling at a time of assembly. For example, the support structure can be fabricated with pre-drilled holes and the base of the adjustable clamp assembly can be coupled (e.g., by one or more fasteners) to the pre-drilled holes. By reducing (or eliminating) drilling processes at the time of assembly, operational efficiencies can be improved and a risk of foreign object debris (FOD) can be reduced (or minimized).

Referring now to FIGS. 1-4, an adjustable clamp system 100 is depicted according to an example embodiment. As shown in FIGS. 1-4, the adjustable clamp system 100 includes a base 110 and a clamp assembly 112. The base 110 includes an anchor portion 114, a first clamp-support portion 116 extending from the anchor portion 114, and a second clamp-support portion 118 extending from the anchor portion 114. As described in further detail below, the anchor portion 114 can couple the base 110 to a support structure. Within examples, the support structure can include one or more structures in an aerospace vehicle (e.g., an aircraft fuselage, an aircraft stringer, and/or a bulkhead), a terrestrial vehicle, a maritime vehicle, and/or a stationary installation (e.g., a building).

The clamp assembly 112 includes a clamp 120, a first flange 122 extending from a first side 124 of the clamp 120, and a second flange 126 extending from a second side 128 of the clamp 120. The clamp 120 defines a bore 121 in which the clamp 120 can receive and retain a tube. Within examples, the tube can provide a conduit for fluid, gas (e.g., air and/or inert gases), fuel, electrical wires, and/or optical fibers. In some examples, the adjustable clamp system 100 can include a tubular cushion 130 in the bore 121 of the clamp 120. The tubular cushion 130 can help to absorb vibrations and/or reduce wear on the clamp 120 and/or the tube. As examples, the tubular cushion 130 can be made from a rubber and/or a thermoplastic elastomer.

Figure 2:
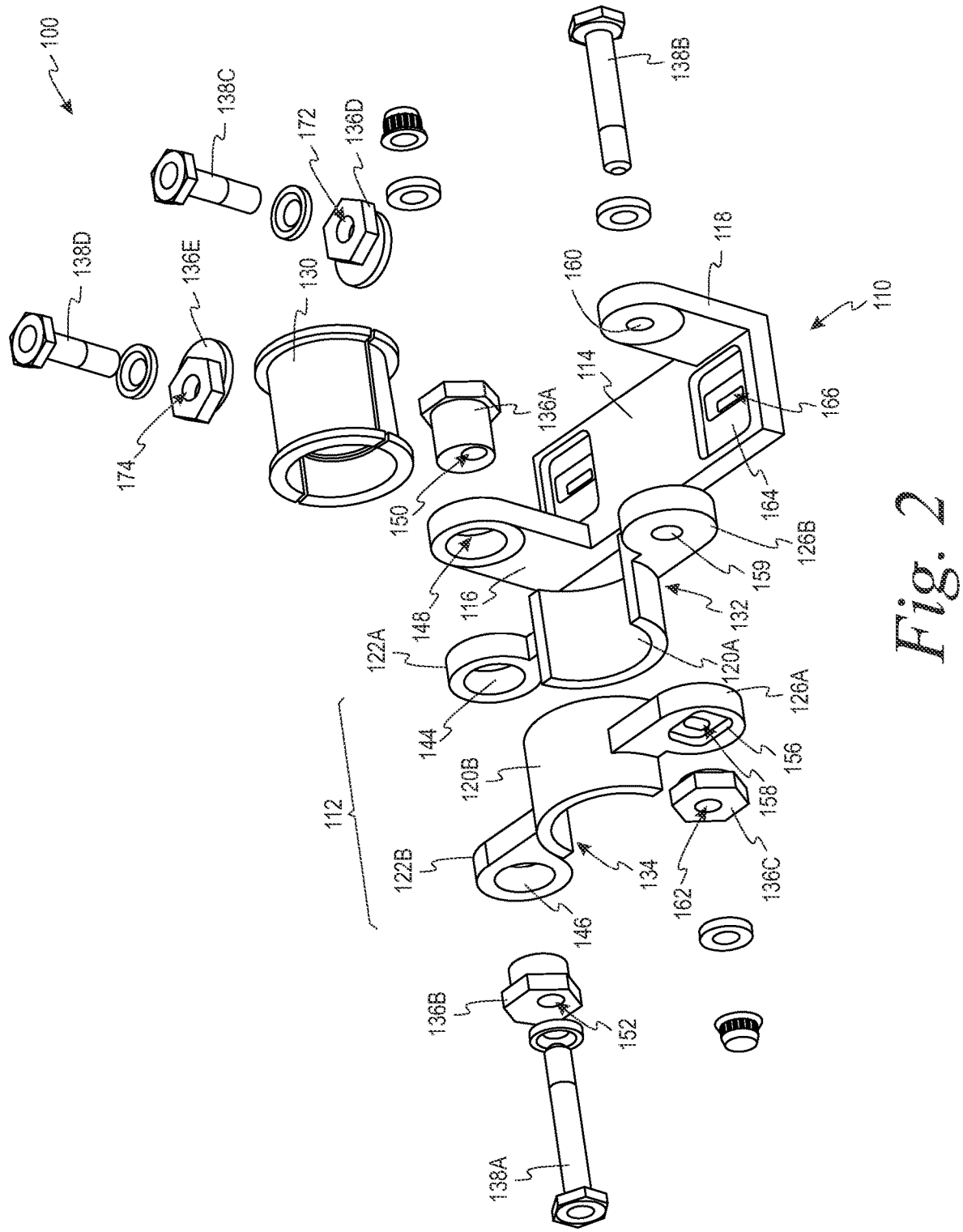
FIG. 2 illustrates an exploded view of the adjustable clamp system shown in FIG. 1, according to an example embodiment.
Figure 3:
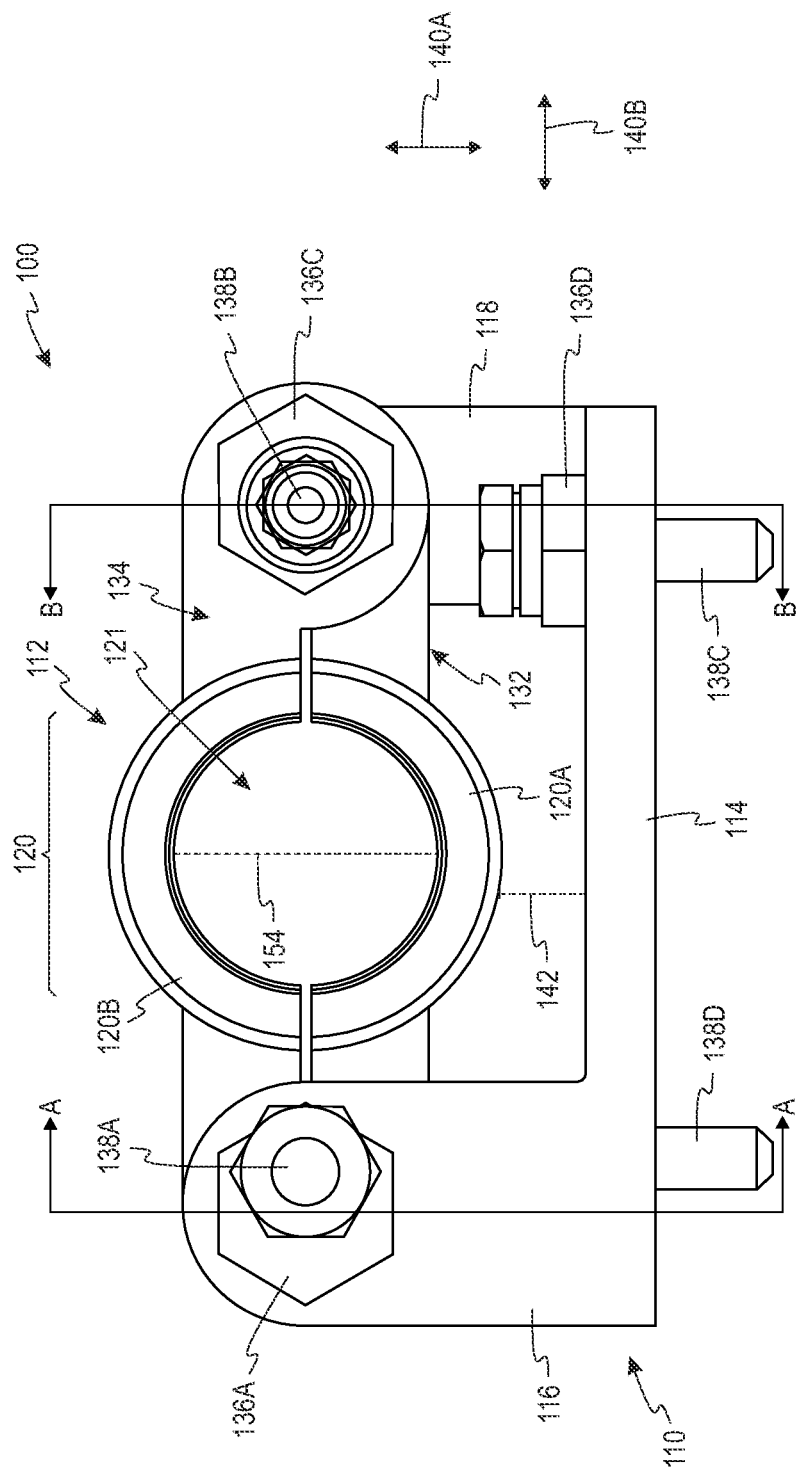
FIG. 3 illustrates an elevation view of the adjustable clamp system shown in FIG. 1, according to an example embodiment.
Figure 4:
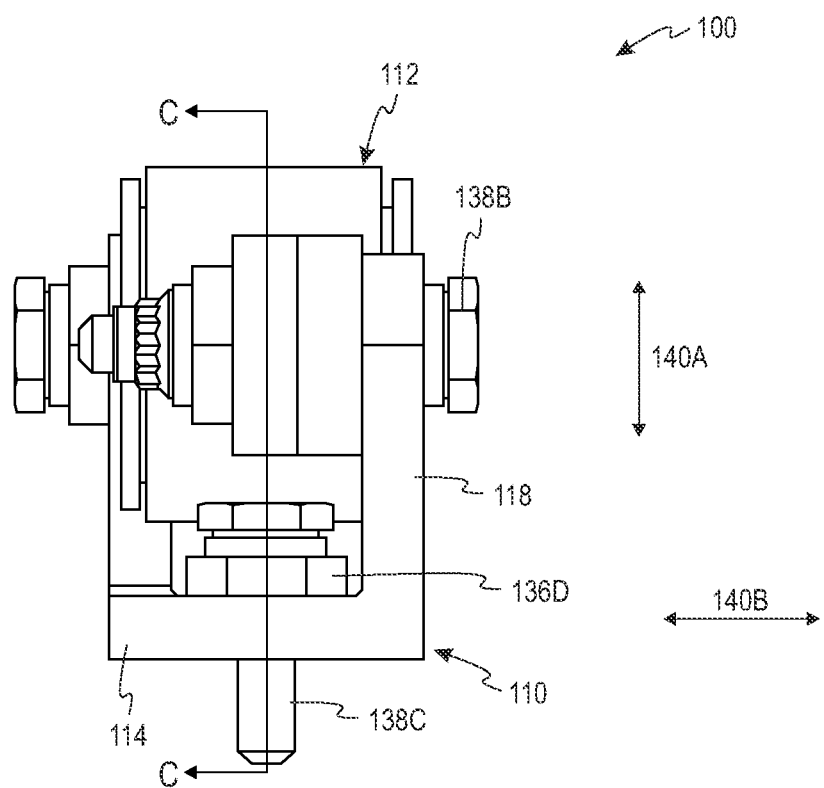
FIG. 4 illustrates another elevation view of the adjustable clamp system shown in FIG. 1, according to an example embodiment.

In FIGS. 1-3, the bore 121 and the tubular cushion 130 each have a generally circular shape. Within examples, however, the clamp 120 can be adjustable such that a size of the bore 121 can be expanded. In some instances, when the clamp 120 is adjusted to expand the size of the bore 121, the bore 121 can have a generally oblong shape. In other examples, the bore 121 and/or the tubular cushion 130 can have a noncircular shape such as, for instance, a hexagonal shape. This may be beneficial in implementations in which the tube positioned in the clamp 120 has a non-circular shape. For instance, when the bore 121 and the tube have corresponding non-circular shapes, the clamp 120 can help to inhibit (or prevent) rotation of the tube in the bore 121 of the clamp 120.

As shown in FIGS. 1 and 3, the first flange 122 is coupled to the first clamp-support portion 116 of the base 110, and the second flange 126 is coupled to the second clamp-support portion 118 of the base 110. As the first clamp-support portion 116 and the second clamp-support portion 118 extend from the anchor portion 114, the clamp 120 of the clamp assembly 112 is located at a distance in a first direction 140A from the anchor portion 114 of the base 110 (i.e., the clamp 120 is located at a distance 142 above the anchor portion 114). Accordingly, when the tube is coupled to the clamp 120, the tube can be maintained at an elevated position above the support structure. By maintaining the tube at the elevated position, the tube can be separated from support structure, which can help to reduce (or minimize) wear on the tube and/or support structure.

As shown in FIG. 2, the clamp assembly 112 can include a first clamping member 132 and a second clamping member 134. The first clamping member 132 can include a first portion 122A of the first flange 122, a first portion 120A of the clamp 120, and a first portion 126A of the second flange 126. The second clamping member 134 can include a second portion 122B of the first flange 122, a second portion 120B of the clamp 120, a second portion 126B of the second flange 126. In FIGS. 1-3, the first portion 120A of the clamp 120 defines a bottom half of the clamp 120 and the second portion 120B of the clamp 120 defines a top half of the clamp 120.

Within examples, the first clamping member 132 and the second clamping member 134 can be movable relative to each other to adjust the size of the bore 121 defined by the clamp 120 (e.g., a diameter 154 of the bore 121 defined by the clamp 120). As such, the clamp assembly 112 can be adjusted to accommodate a plurality of tubes having different sizes. This may enhance manufacturing and/or inventory efficiencies as the adjustable clamp system 100 can be used for a relatively wide variety of tubes. Additionally, as described in further detail, the adjustability of the bore 121 can help to facilitate coupling the tube to the adjustable clamp system 100 (e.g., by first inserting the tube in the bore 121 and then reducing the size of the bore 121 until the tube is secured).

As noted above, the first flange 122 of the clamp assembly 112 is coupled to the first clamp-support portion 116 of the base 110. In FIGS. 1-3, the adjustable clamp system 100 includes a first eccentric bushing 136A, a second eccentric bushing 136B, and a first fastener 138A coupling the first flange 122 of the clamp assembly 112 to the first clamp-support portion 116 of the base 110. As described in further detail below, the first eccentric bushing 136A and the second eccentric bushing 136B are rotatable relative to the first flange 122 to translate the clamp assembly 112 in a first direction 140A relative to the base 110 and adjust a distance 142 between the clamp 120 and the anchor portion 114 of the base 110.

As shown in FIG. 2, the first clamping member 132 can include a first aperture 144 in the first portion 122A of the first flange 122, the second clamping member 134 can include a second aperture 146 in the second portion 122B of the first flange 122, and the first clamp-support portion 116 of the base 110 can include a first opening 148. The first aperture 144, the second aperture 146, and the first opening 148 can be aligned with each other.

In this arrangement, when the adjustable clamp system 100 is assembled as shown in FIGS. 1 and 3, the first eccentric bushing 136A can be in the first aperture 144 of the first clamping member 132 and the second aperture 146 of the second clamping member 134. Additionally, the second eccentric bushing 136B can be in the first opening 148 in the first clamp-support portion 116 of the base 110. The first fastener 138A can extend through a first hole 150 defined by the first eccentric bushing 136A and a second hole 152 defined by the second eccentric bushing 136B. As shown in FIG. 2, the first hole 150 is at an off-center position on the first eccentric bushing 136A and the second hole 152 is at an off-center position on the second eccentric bushing 136B. As described below, this can help to translate the clamp assembly 112 in the first direction 140A relative to the base 110 and adjust the distance 142 between the clamp 120 and the anchor portion 114 of the base 110 when the first eccentric bushing 136A and the second eccentric bushing 136B rotate about the first fastener 138A.

Additionally, as noted above, the second flange 126 of the clamp assembly 112 is coupled to the second clamp-support portion 118 of the base 110. In FIGS. 1-3, the adjustable clamp system 100 includes a third eccentric bushing 136C and a second fastener 138B coupling the second flange 126 of the clamp assembly 112 to the second clamp-support portion 118 of the base 110. As described in further detail below with respect to FIGS. 9A-9C, the third eccentric bushing 136C is rotatable relative to the second flange 126 to translate the second portion 120B of the clamp 120 relative to the first portion 120A of the clamp 120 in the first direction 140A and adjust the diameter 154 of the bore 121 defined by the clamp 120.

As shown in FIG. 2, the first clamping member 132 can include a first pocket 156 in the second portion 126B of the second flange 126 and a first slot 158 extending through the second portion 126B of the second flange 126 at the first pocket 156. A longitudinal axis of the first slot 158 is substantially parallel to the first direction 140A. Additionally, the second portion 126B of the second flange 126 can include a third aperture 159, and the second clamp-support portion 118 of the base 110 can include a second opening 160.

In this arrangement, when the adjustable clamp system 100 is assembled as shown in FIGS. 1 and 3, the third eccentric bushing 136C can be in the first pocket 156, and the second fastener 138B can extend through a third hole 162 defined by the third eccentric bushing 136C, the first slot 158 in the first portion 126A of the second flange 126, the third aperture 159 in the second portion 126B of the second flange 126, and the second opening 160 in the second clamp-support portion 118 of the base 110. The third hole 162 can be at an off-center location in the third eccentric bushing 136C. As such, the third eccentric bushing 136C can engage the first pocket 156 during rotation of the third eccentric bushing 136C (about the second fastener 138B) to translate the second portion 120B of the clamp 120 relative to the first portion 120A of the clamp 120 and the diameter 154 of the bore 121 defined by the clamp 120.

Within examples, the adjustable clamp system 100 can include a third fastener 138C, a fourth fastener 138D, a fourth eccentric bushing 136D, and a fifth eccentric bushing 136E for coupling the base 110 to the support structure. The fourth eccentric bushing 136D can be received in a second pocket 164 in the anchor portion 114 of the base 110, which includes a second slot 166 extending through the anchor portion 114 at the second pocket 164. The fifth eccentric bushing 136E can be received in a third pocket 168, which includes a third slot 170 extending through the anchor portion 114 at the third pocket 168.

The second slot 166 can have a longitudinal axis that is orthogonal to a longitudinal axis of the second pocket 164, and the third slot 170 can have a longitudinal axis that is orthogonal to a longitudinal axis of the third pocket 168. In this arrangement, when the adjustable clamp system 100 is assembled as shown in FIGS. 1 and 3, the third fastener 138C can extend through the second slot 166 in the anchor portion 114 of the base 110 and a fourth hole 172 defined by the fourth eccentric bushing 136D and, and the fourth fastener 138D can extend the third slot 170 in the anchor portion 114 of the base 110 and a fifth hole 174 defined by the fifth eccentric bushing 136E. The fourth hole 172 can be at an off-center location in the fourth eccentric bushing 136D, and the fifth hole 174 can be at an off-center location in the fifth eccentric bushing 136E.

As such, in this arrangement, the fourth eccentric bushing 136D and the fifth eccentric bushing 136E are rotatable relative to the anchor portion 114 to translate the anchor portion 114 of the base 110 in a second direction 140B, which is parallel to the longitudinal axis of the second slot 166 and the longitudinal axis of the third slot 170. As shown in FIGS. 1 and 3, the second direction 140B is orthogonal to the first direction 140A.

In FIGS. 1-4, the first fastener 138A, the second fastener 138B, the third fastener 138C, and/or the fourth fastener 138D each include a respective bolt having a threaded portion, a bolt head, one or more washers, and/or one or more nuts for coupling various components to each other. However, in other examples, the first fastener 138A, the second fastener 138B, the third fastener 138C, and/or the fourth fastener 138D can be configured differently. For instance, in other examples, the first fastener 138A, the second fastener 138B, the third fastener 138C, and/or the fourth fastener 138D can additionally or alternatively include a quick release pin, or any other suitable fastening mechanism.

Figure 5A:
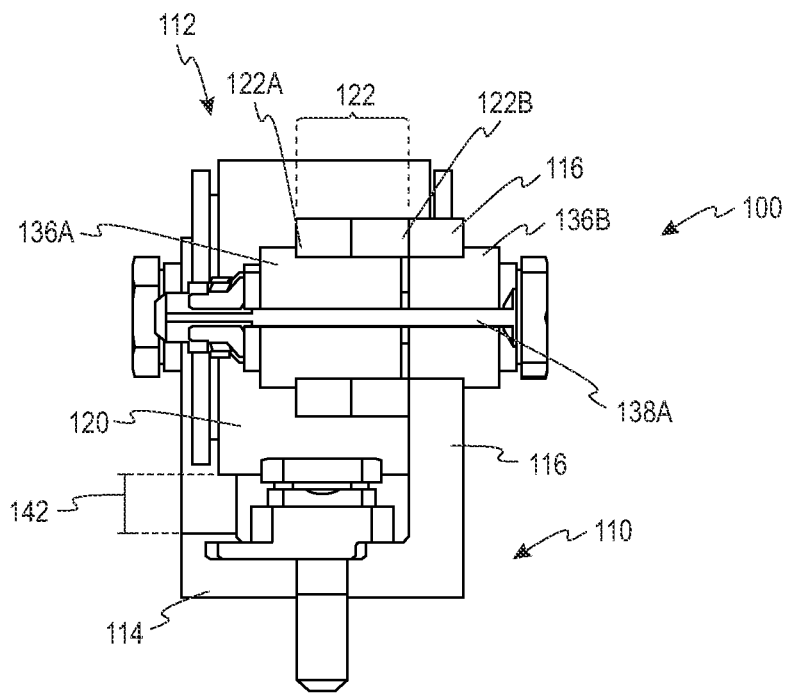
FIG. 5A illustrates a cross-sectional view of the adjustable clamp system shown in FIG. 3 with eccentric bushings in a first position, according to an example embodiment.

Referring now to FIGS. 5A-7B, the adjustability of the distance between the clamp 120 and the anchor portion 114 of the base 110 will be described according to an example embodiment. FIG. 5A depicts a cross-sectional view of the adjustable clamp system 100 through a line A shown in FIG. 3 with the first eccentric bushing 136A and the second eccentric bushing 136B in a first position. FIG. 5B depicts the first eccentric bushing 136A and the second eccentric bushing 136B in the first position illustrated in FIG. 5A.

As shown in FIG. 5A, the first eccentric bushing 136A engages the first portion 122A and the second portion 122B of the first flange 122, and the second eccentric bushing 136B engages the first clamp-support portion 116. Additionally, in FIG. 5A, the first fastener 138A extends through the first eccentric bushing 136A and the second eccentric bushing 136B (e.g., via the first hole 150 and the second hole 152, respectively, shown in FIG. 2). Thus, a position of the clamp assembly 112 relative to the base 110 corresponds to a position of the first eccentric bushing 136A relative to the second eccentric bushing 136B.

Figure 5B:
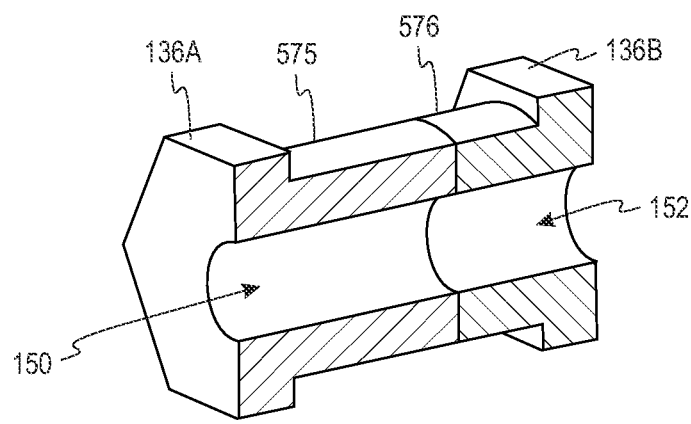
FIG. 5B illustrates a cross-sectional view of the eccentric bushings shown in FIG. 5A, according to an example embodiment.

In the first position shown in FIGS. 5A-5B, the first eccentric bushing 136A and the second eccentric bushing 136B are rotationally offset from each other at a relative angle of approximately 0 degrees. As shown in FIG. 5B, an exterior surface 575 of the first eccentric bushing 136A and an exterior surface 576 of the second eccentric bushing 136B are at approximately the same position in the first direction 140A. As such, in FIG. 5A, the first flange 122 is at a corresponding first position relative to the first clamp-support portion 116 of the base 110, and the clamp 120 is at a first distance 542 relative to the anchor portion 114 of the base 110.

Figure 6A:
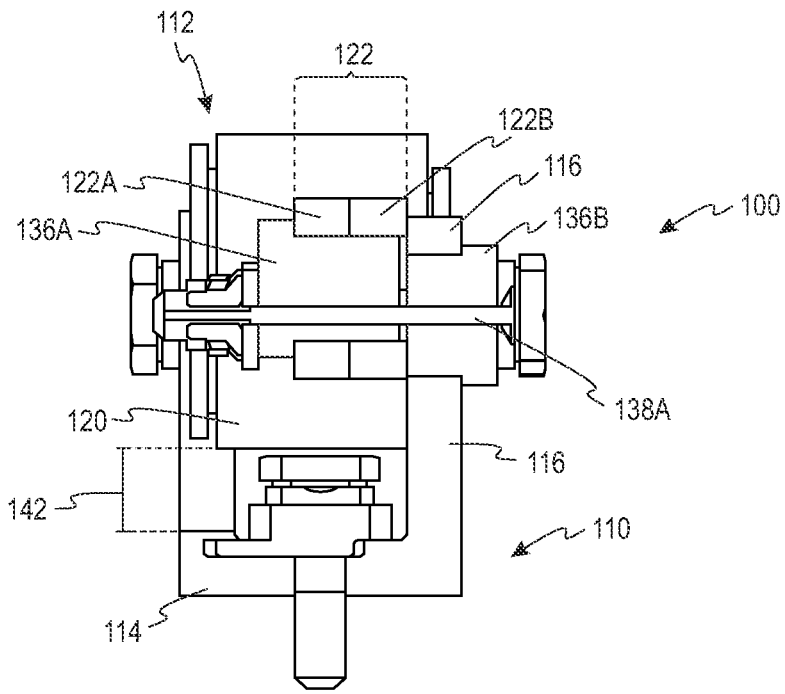
FIG. 6A illustrates another cross-sectional view of the adjustable clamp system shown in FIG. 3 with the eccentric bushings in a second position, according to an example embodiment.
Figure 6B:
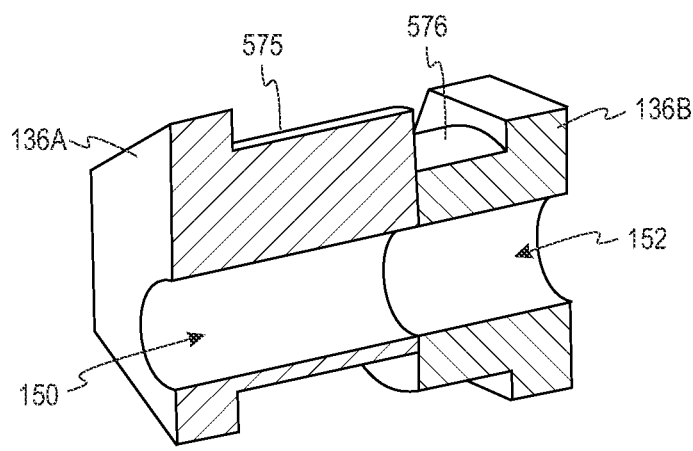
FIG. 6B illustrates a cross-sectional view of eccentric bushings shown in FIG. 6A, according to an example embodiment.

FIG. 6A depicts a cross-sectional view of the adjustable clamp system 100 through the line A shown in FIG. 3 with the first eccentric bushing 136A and the second eccentric bushing 136B in a second position. FIG. 6B depicts the first eccentric bushing 136A and the second eccentric bushing 136B in the second position illustrated in FIG. 6A. In this example, the first eccentric bushing 136A and the second eccentric bushing 136B can transition from the first position shown in FIGS. 5A-5B to the second position shown in FIGS. 6A-6B by rotating, about the first fastener 138A, the first eccentric bushing 136A relative to the first flange 122.

In the second position shown in FIGS. 6A-6B, the first eccentric bushing 136A and the second eccentric bushing 136B are rotationally offset from each other at a relative angle of approximately 90 degrees. As shown in FIG. 6B, the exterior surface 575 of the first eccentric bushing 136A is at an elevated position relative to the exterior surface 576 of the second eccentric bushing 136B. As such, in FIG. 6A, the first flange 122 is at a second, elevated position relative to the first clamp-support portion 116 of the base 110, and the clamp 120 is at a second distance 642 relative to the anchor portion 114 of the base 110. In this example, the second distance 642 shown in FIG. 6A is greater than the first distance 542 shown in FIG. 5A.

Figure 7A:
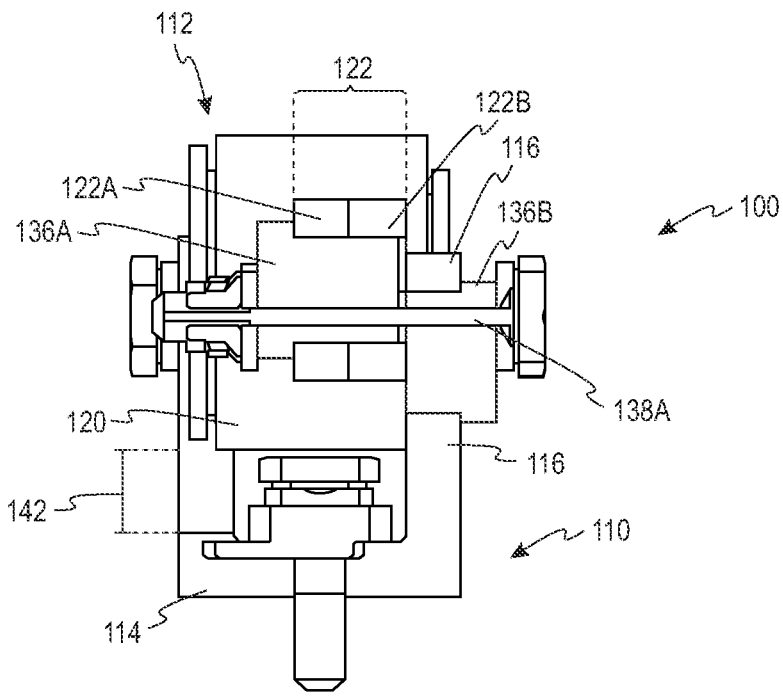
FIG. 7A illustrates a cross-sectional view of the adjustable clamp system shown in FIG. 3 with eccentric bushings in a third position, according to an example embodiment.
Figure 7B:
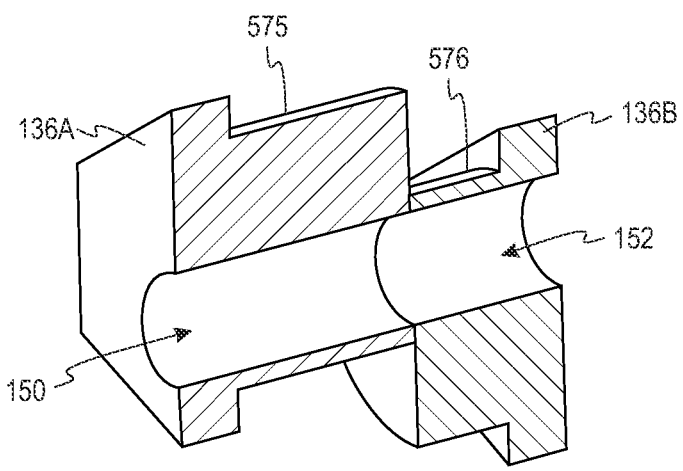
FIG. 7B illustrates a cross-sectional view of eccentric bushings shown in FIG. 7A, according to an example embodiment.

FIG. 7A depicts a cross-sectional view of the adjustable clamp system 100 through the line A shown in FIG. 3 with the first eccentric bushing 136A and the second eccentric bushing 136B in a third position. FIG. 7B depicts the first eccentric bushing 136A and the second eccentric bushing 136B in the third position illustrated in FIG. 7A. In this example, the first eccentric bushing 136A and the second eccentric bushing 136B can transition from the second position shown in FIGS. 6A-6B to the third position shown in FIGS. 7A-7B by rotating, about the first fastener 138A, the second eccentric bushing 136B relative to the first flange 122.

In the third position shown in FIGS. 7A-7B, the first eccentric bushing 136A and the second eccentric bushing 136B are rotationally offset from one another at a relative angle of approximately 180 degrees. As shown in FIG. 7B, the exterior surface 575 of the first eccentric bushing 136A is further elevated relative to the exterior surface 576 of the second eccentric bushing 136B. As such, in FIG. 7A, the first flange 122 is at a third, elevated position relative to the first clamp-support portion 116 of the base 110, and the clamp 120 is at a third distance 742 relative to the anchor portion 114 of the base 110. In this example, the third distance 742 shown in FIG. 7A is greater than the first distance 542 shown in FIG. 5A and the second distance 642 shown in FIG. 6A.

Accordingly, as shown in FIGS. 5A-7C, by rotating the first eccentric bushing 136A and/or the second eccentric bushing 136B, the adjustable clamp system 100 can provide for adjusting the distance 142 of the clamp 120 relative to the anchor portion 114 of the base 110. In other words, the first eccentric bushing 136A and the second eccentric bushing 136B can provide for raising and/or lowering the clamp 120 relative to the base 110 and the support structure. Within examples, the first eccentric bushing 136A and/or the second eccentric bushing 136B can be rotated prior to or after coupling the tube to the clamp 120. This can help to improve operational flexibility and/or efficiency in coupling the tube to one or more adjustable clamp systems 100.

Figure 8:
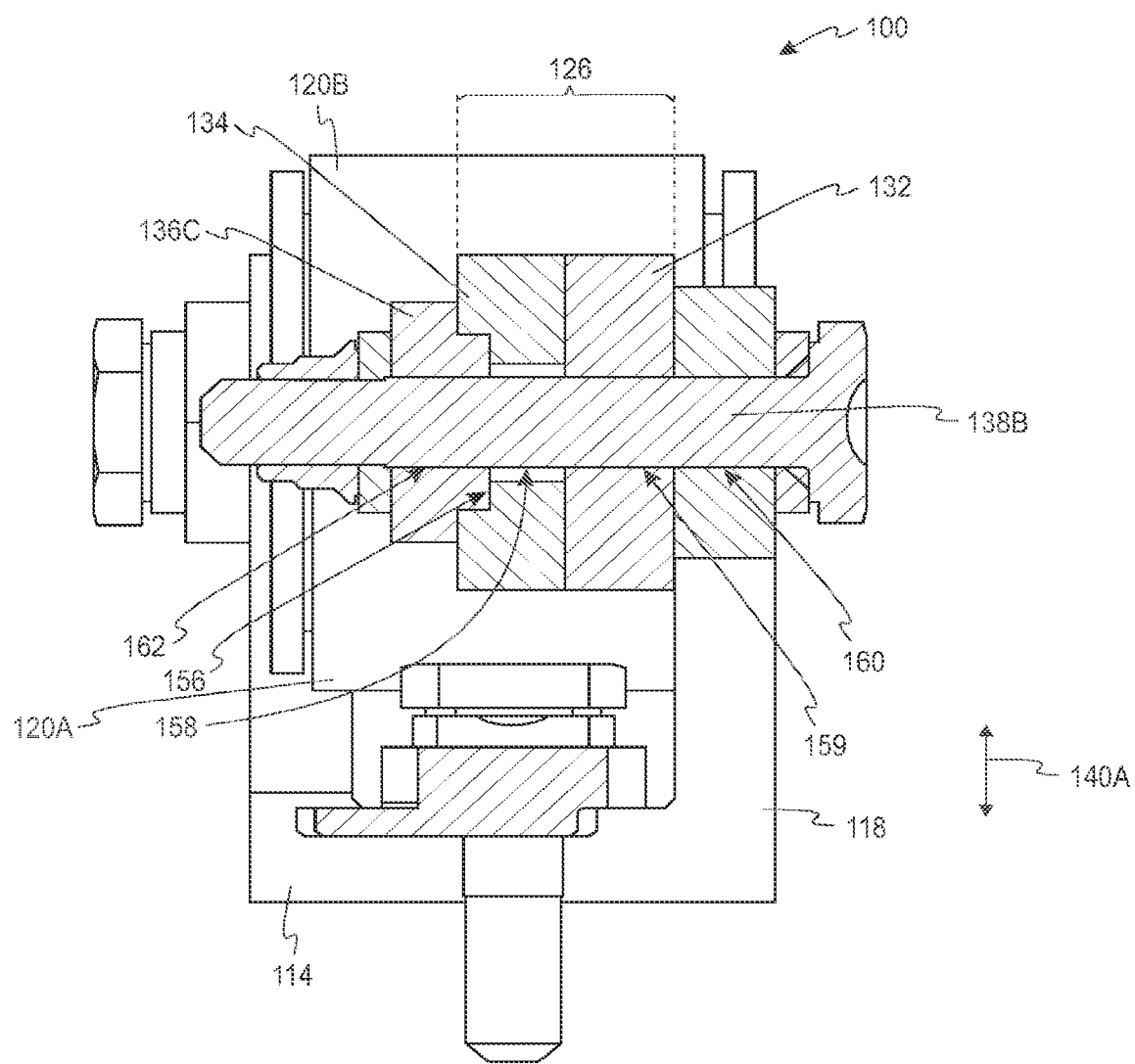
FIG. 8 illustrates another cross-sectional view of the adjustable clamp system shown in FIG. 3, according to an example embodiment.

Referring now to FIGS. 8 and 9A-9C, the adjustability of the size of the bore 121 defined by the clamp 120 will be described according to an example embodiment. FIG. 8 depicts a cross-sectional view of the adjustable clamp system 100 through the line B shown in FIG. 3. As shown in FIG. 8, the third eccentric bushing 136C is received in and engages the first pocket 156. Additionally, in FIG. 8, the second fastener 138B extends through the second opening 160 of the second clamp-support portion 118, the third aperture 159 of the first clamping member 132, the first slot 158 of the second clamping member 134, and the third hole 162 of the third eccentric bushing 136C.

Because the third eccentric bushing 136C engages the second clamping member 134 but not the first clamping member 132, rotation of the third eccentric bushing 136C relative to the second flange 126 translates the second portion 120B of the clamp 120 relative to the first portion 120A of the clamp 120 in the first direction 140. Translating the second portion 120B of the clamp 120 relative to the first portion 120A of the clamp 120 causes an adjustment to the diameter 154 (shown in FIG. 3) of the bore 121.

Additionally, as noted above, rotating the third eccentric bushing 136C causes the third eccentric bushing 136C to act on the first pocket 156 to translate the second portion 126B of the second flange 126 relative to the first portion 126A of the second flange 126. The translation of the second portion 126B of the second flange 126 can be further facilitated by the first slot 158. For instance, when assembled, the second fastener 138B can be coupled to the base 110 at a fixed position due to the second fastener 138B extending through the second opening 160 in the second clamp-support portion 118 and the third aperture 159 in the first portion 126A of the second flange 126. Because the first slot 158 has a longitudinal axis that is substantially parallel to the first direction 140A, the second fastener 138B can translate in the first slot 158 as the second portion 126B of the second flange 126 translates relative to the first portion 126A of the second flange 126.

Figure 9A:
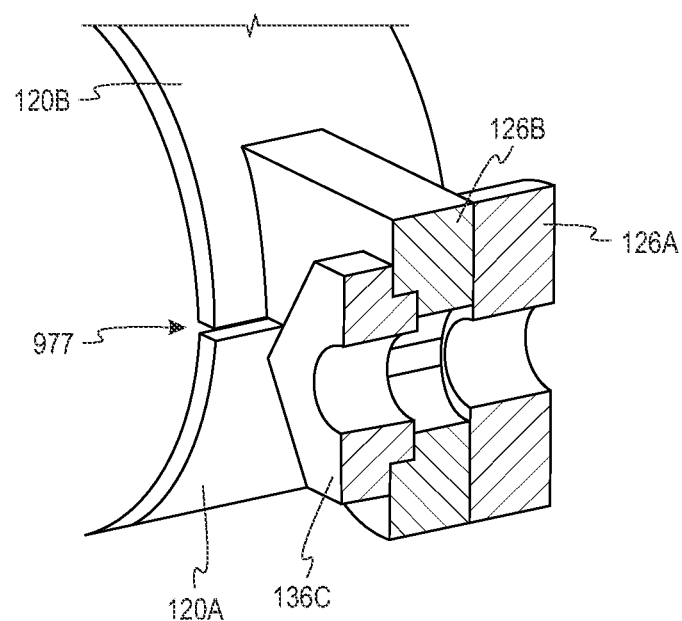
FIG. 9A illustrates a partial cross-sectional view of an eccentric bushing and a clamp assembly for the adjustable clamp system shown in FIG. 8 with the eccentric bushing in a first position, according to an example embodiment.

FIG. 9A depicts a portion of the clamp 120 when the third eccentric bushing 136C is in a first position according to an example embodiment. Specifically, in FIG. 9A, the third eccentric bushing 136C is at an angle of approximately 0 degrees relative to the second flange 126. In the first position, a gap 977 having a first size is formed between the first portion 120A of the clamp 120 and the second portion 120B of the clamp 120. When the gap 977 has the first size shown in FIG. 9A, the diameter 154 of the bore 121 has a corresponding first size. In this example, when the third eccentric bushing 136C is in the first position, the clamp 120 can be in a partially opened position (i.e., between a fully closed position and a fully opened position).

Figure 9B:
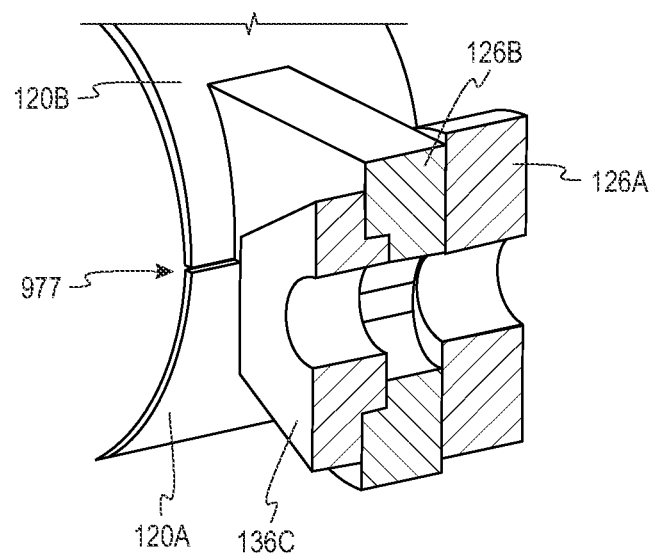
FIG. 9B illustrates a partial cross-sectional view of an eccentric bushing and a clamp assembly for the adjustable clamp system shown in FIG. 8 with the eccentric bushing in a second position, according to an example embodiment.

FIG. 9B depicts a portion of the clamp 120 when the third eccentric bushing 136C is in a second position according to an example embodiment. Specifically, in FIG. 9B, the third eccentric bushing 136C is at an angle of approximately 90 degrees relative to the second flange 126. In the second position, the gap 977 has a second size, which is smaller than the first size of the gap 977 shown in FIG. 9A. In this example, the second size of the gap 977 is a minimum size of the gap 977. Accordingly, when the third eccentric bushing 136C is in the second position, the diameter 154 of the bore 121 has a corresponding second size, which may be a minimum diameter of the bore 121. For example, when the third eccentric bushing 136C is in the second position, the clamp 120 can be in the fully closed position.

Figure 9C:
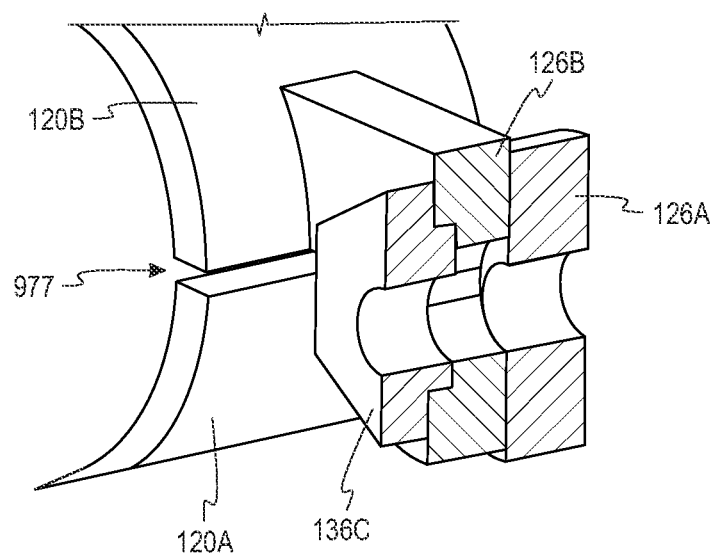
FIG. 9C illustrates a partial cross-sectional view of an eccentric bushing and a clamp assembly for the adjustable clamp system shown in FIG. 8 with the eccentric bushing in a third position, according to an example embodiment.

FIG. 9C depicts a portion of the clamp 120 when the third eccentric bushing 136C is in a third position according to an example embodiment. Specifically, in FIG. 9C, the third eccentric bushing 136C is at an angle of approximately 270 degrees relative to the second flange 126. In the third position, the gap 977 has a third size, which is larger than the first size of the gap 977 shown in FIG. 9A. In this example, the third size of the gap 977 is a maximum size of the gap 977. Accordingly, when the third eccentric bushing 136C is in the third position, the diameter 154 of the bore 121 has a corresponding third size, which may be a maximum diameter of the bore 121. For example, when the third eccentric bushing 136C is in the third position, the clamp 120 can be in the fully opened position.

Accordingly, as shown in FIGS. 9A-9C, by rotating the third eccentric bushing 136C, the adjustable clamp system 100 can provide for adjusting the size (e.g., the diameter) of the bore 121 of the clamp 120. By adjusting the size of the bore 121, the adjustable clamp system 100 can be used with a plurality of tubes having different outer dimensions and/or a plurality of cushions 130 of different sizes. This can help to enhance the versatility of the adjustable clamp system 100 and allow it to be used in a relatively wide variety of different contexts and/or systems. Within examples, the third eccentric bushing 136C can be rotated prior to or after coupling the tube to the clamp 120. This can help to improve operational flexibility and/or efficiency in coupling the tube to one or more adjustable clamp systems 100.

Figure 10A:
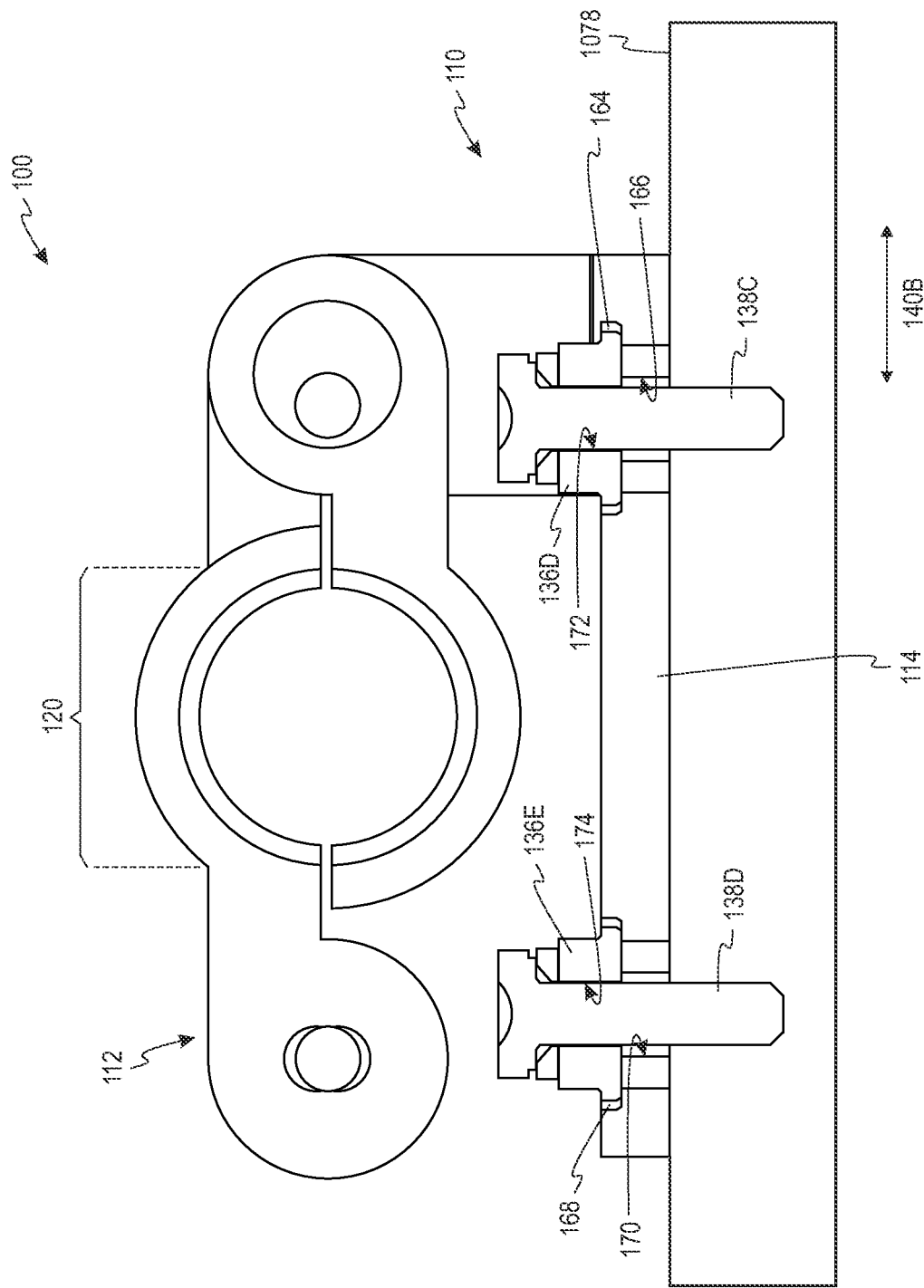
FIG. 10A illustrates a cross-sectional view of the adjustable clamp system shown in FIG. 4 with eccentric bushings in a first position, according to an example embodiment.
Figure 10B:
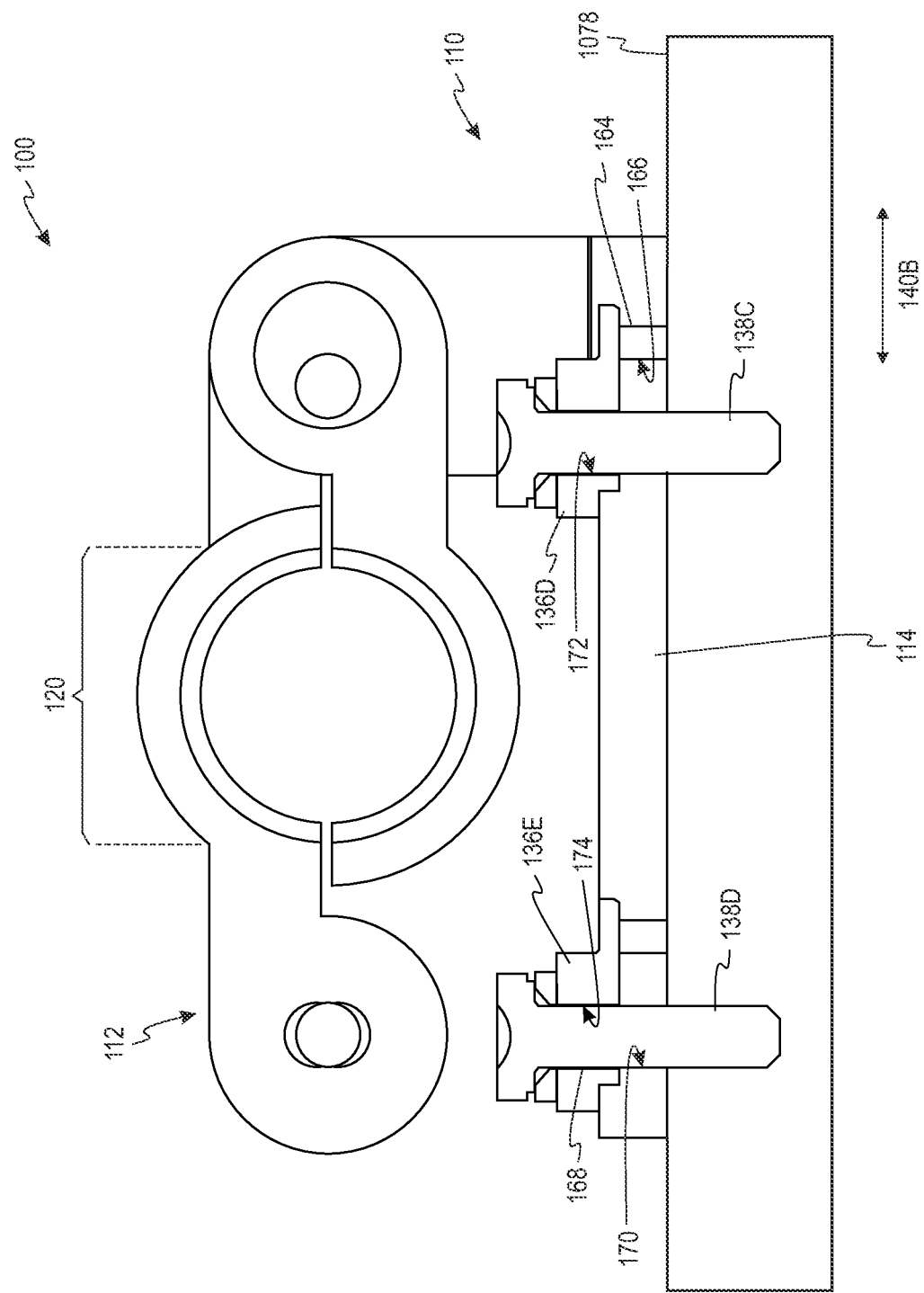
FIG. 10B illustrates a cross-sectional view of the adjustable clamp system shown in FIG. 4 with eccentric bushings in a second position, according to an example embodiment.
Figure 10C:
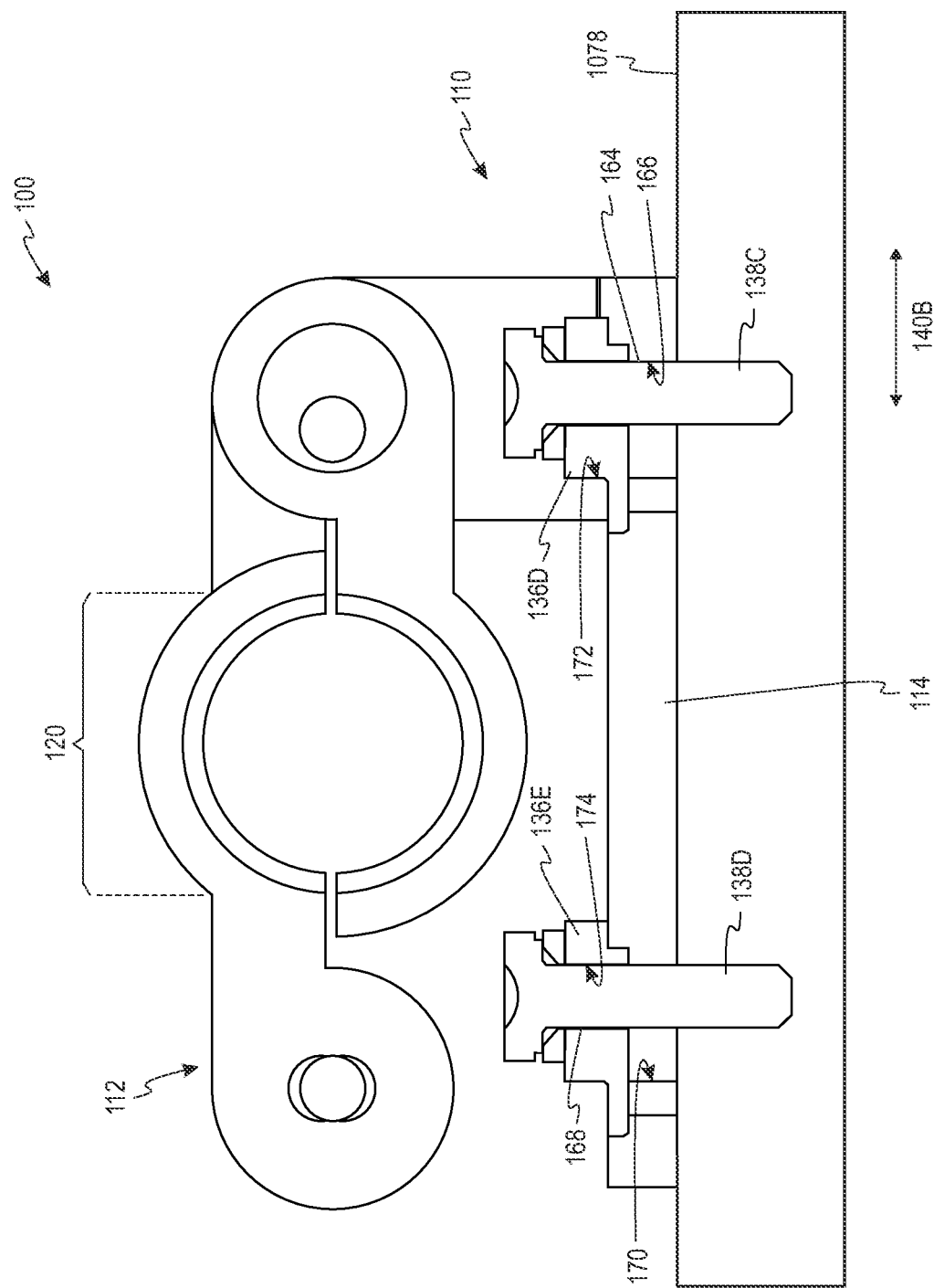
FIG. 10C illustrates a cross-sectional view of the adjustable clamp system shown in FIG. 4 with eccentric bushings in a third position, according to an example embodiment.

Referring now to FIGS. 10A-10C, an adjustability of the adjustable clamp system 100 in the second direction 140B will be described according to an example embodiment. FIG. 10A depicts a cross-sectional view of a support structure 1078 and the adjustable clamp system 100 through the line C shown in FIG. 4 when the fourth eccentric bushing 136D and the fifth eccentric bushing 136E are in respective first positions. FIG. 10B depicts a cross-sectional view of a support structure 1078 and the adjustable clamp system 100 through the line C shown in FIG. 4 when the fourth eccentric bushing 136D and the fifth eccentric bushing 136E are in respective second positions. FIG. 10C depicts a cross-sectional view of a support structure 1078 and the adjustable clamp system 100 through the line C shown in FIG. 4 when the fourth eccentric bushing 136D and the fifth eccentric bushing 136E are in respective third positions.

As shown in FIGS. 10A-10C, the anchor portion 114 of the base 110 is coupled to the support structure 1078 by the third fastener 138C and the fourth fastener 138D. In FIGS. 10A-10C, the fourth eccentric bushing 136D is received in the second pocket 164, and the fifth eccentric bushing 136E is received in the third pocket 168. Also, in FIGS. 10A-10C, the third fastener 138C extends through the fourth hole 172 of the fourth eccentric bushing 136D and the second slot 166 of the anchor portion 114 to couple to the support structure 1078, and the fourth fastener 138D extends through the fifth hole 174 of the fifth eccentric bushing 136E and the third slot 170 of the anchor portion 114 to couple to the support structure 1078.

In this arrangement, rotation of the fourth eccentric bushing 136D about the third fastener 138C causes the fourth eccentric bushing 136D to act on the second pocket 164, and rotation of the fifth eccentric bushing 136E about the fourth fastener 138D causes the fifth eccentric bushing 136E to act on the third pocket 168. Due to the third fastener 138C and the fourth fastener 138D being coupled to the support structure 1078, the third fastener 138C and the fourth fastener 138D remain at a fixed position. As a result, the engagement between the fourth eccentric bushing 136D and the second pocket 164 and the engagement between the fifth eccentric bushing 136E and the third pocket 168 causes the base 110 to translate in the second direction 140B. Further, the translation of the base 110 in the second direction 140B is guided by the second slot 166 (in which the third fastener 138C is located) and the third slot 170 (in which the fourth fastener 138D is located), which have respective longitudinal axes that are parallel to the second direction 140B.

As shown in FIG. 10A, when the fourth eccentric bushing 136D and the fifth eccentric bushing 136E are in the first positions, the fourth eccentric bushing 136D and the fifth eccentric bushing 136E can each be at an angle of approximately 0 degrees relative to the second pocket 164 of the anchor portion 114 and the third pocket 168 of the anchor portion 114, respectively. Also, in the first positions, the fourth hole 172 of the fourth eccentric bushing 136D is centered over the second slot 166 of the anchor portion 114 and the fifth hole 174 of the fifth eccentric bushing 136E is centered over the third slot 170 of the anchor portion 114. This results in the base 110 and the clamp assembly 112 being located at a center position relative to the third fastener 138C and the fourth fastener 138D, which are fixedly coupled to the support structure 1078.

As shown in FIG. 10B, when the fourth eccentric bushing 136D and the fifth eccentric bushing 136E are in the second positions, the fourth eccentric bushing 136D and the fifth eccentric bushing 136E can each be at an angle of approximately 90 degrees relative to the second pocket 164 of the anchor portion 114 and the third pocket 168 of the anchor portion 114, respectively. Also, in the second positions, the fourth hole 172 of the fourth eccentric bushing 136D is at a first lateral position over the second slot 166 of the anchor portion 114 and the fifth hole 174 of the fifth eccentric bushing 136E is at a first lateral position over the third slot 170 of the anchor portion 114 (i.e., the fourth eccentric bushing 136D and the fifth eccentric bushing 136E are shifted left of the positions shown in FIG. 10A). This results in the base 110 and the clamp assembly 112 being located at a first lateral position relative to the third fastener 138C and the fourth fastener 138D, which are fixedly coupled to the support structure 1078.

As shown in FIG. 10C, when the fourth eccentric bushing 136D and the fifth eccentric bushing 136E are in the third positions, the fourth eccentric bushing 136D and the fifth eccentric bushing 136E can each be at an angle of approximately 270 degrees relative to the second pocket 164 of the anchor portion 114 and the third pocket 168 of the anchor portion 114, respectively. Also, in the third positions, the fourth hole 172 of the fourth eccentric bushing 136D is at a second lateral position over the second slot 166 of the anchor portion 114 and the fifth hole 174 of the fifth eccentric bushing 136E is at a second lateral position over the third slot 170 of the anchor portion 114 (i.e., the fourth eccentric bushing 136D and the fifth eccentric bushing 136E are shifted right of the positions shown in FIG. 10A). This results in the base 110 and the clamp assembly 112 being located at a second lateral position relative to the third fastener 138C and the fourth fastener 138D, which are fixedly coupled to the support structure 1078. In this example, the first lateral position and the second lateral position define opposite ends of a range of lateral positions in the second direction 140B at which the base 110 and the clamp assembly 112 can be located by rotation of the third eccentric bushing 136C and the fourth eccentric bushing 136D.

FIG. 11 depicts a system 1101 including a plurality of adjustable clamp systems 100A-100C coupling to a tube 1179 to a support structure 1078 according to an example embodiment. The adjustable clamp systems 100A-100C include a first adjustable clamp system 100A, a second adjustable clamp system 100B, and a third adjustable clamp system 100C. The adjustable clamp systems 100A-100C are identical to the adjustable clamp system 100 described above with respect to FIGS. 1-10C. However, one or more of the eccentric bushings 1136 of the first adjustable clamp system 100A, the second adjustable clamp system 100B, and the third adjustable clamp system 100C are in different respective positions to accommodate variations in one or more dimensions of the tube 1179, a location of pre-drilled holes in the support structure 1078, and/or structural variations in the support structure (e.g., a non-level surface of the support structure).

For instance, in FIG. 11, the second adjustable clamp system 100B can be vertically adjusted in the first direction 140A and laterally adjusted in the second direction 140B relative to the first adjustable clamp system 100A. Additionally, for instance, the third adjustable clamp system 100C can be adjusted to a larger bore than the second adjustable clamp system 100B. Other examples are also possible.

Figure 12A:
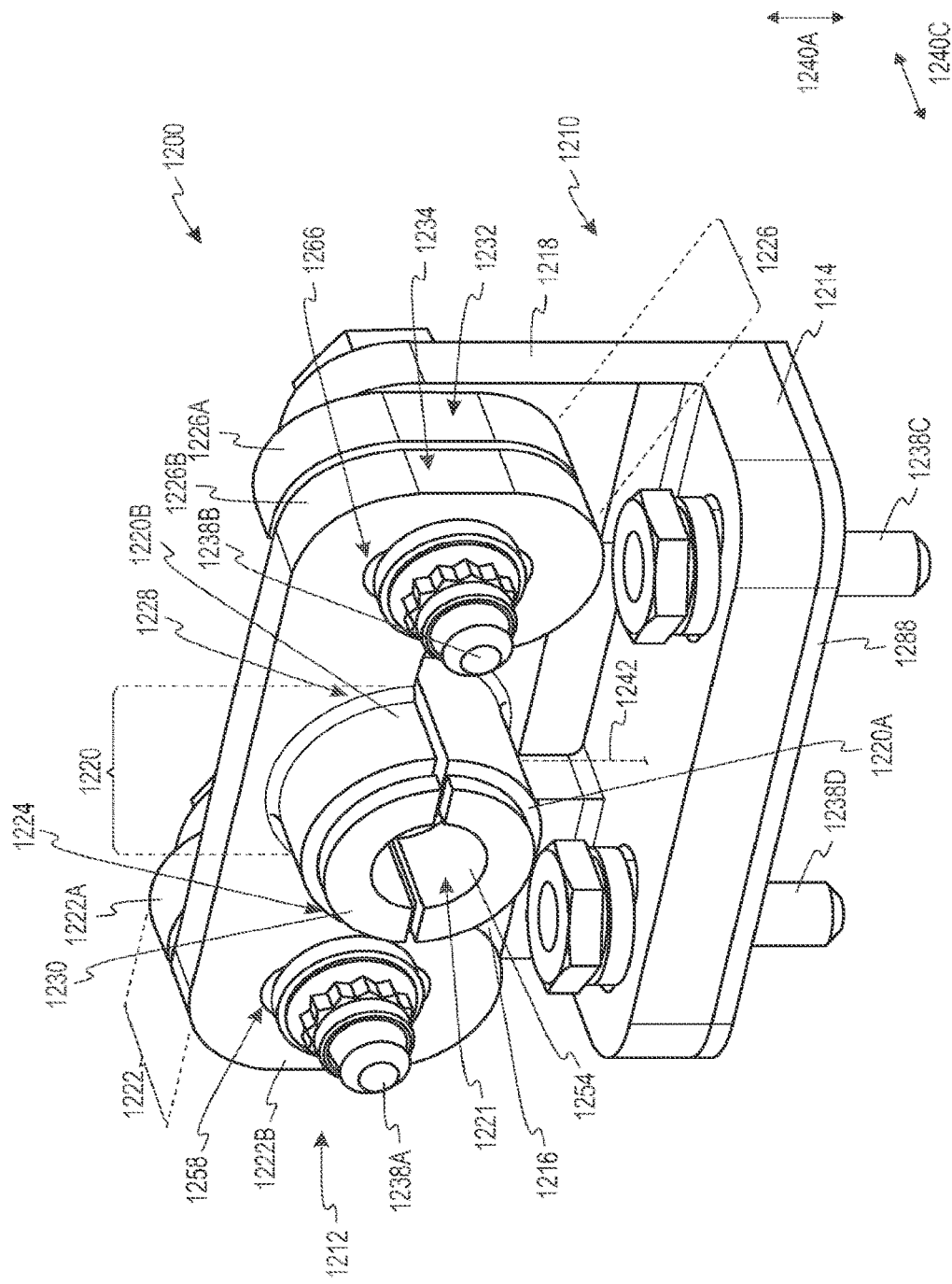
FIG. 12A illustrates a perspective view of an adjustable clamp system in a first state, according to another example embodiment.
Figure 12B:
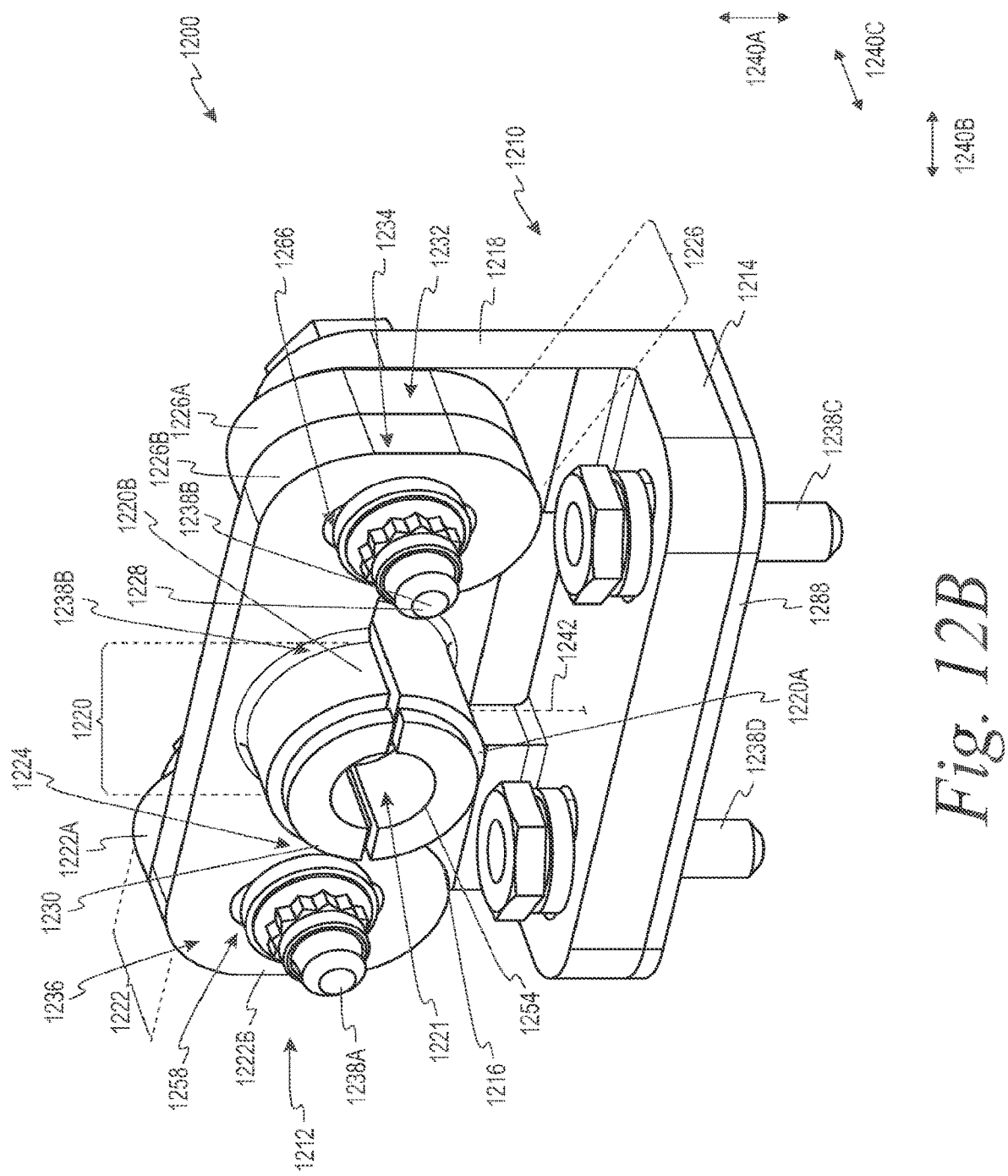
FIG. 12B illustrates a perspective view of the adjustable clamp system of FIG. 12A in a second state, according to an example embodiment.
Figure 12C:
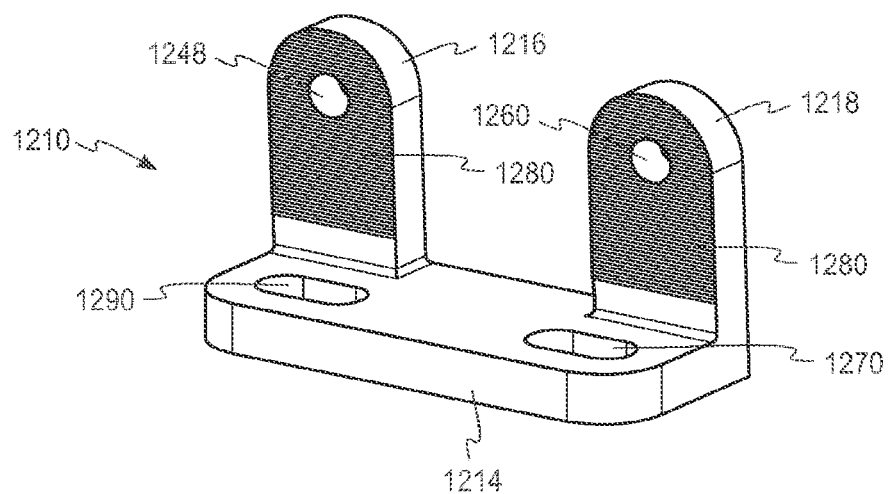
FIG. 12C illustrates a perspective view of a base of the adjustable clamp system shown in FIG. 12A, according to an example embodiment.
Figure 12D:
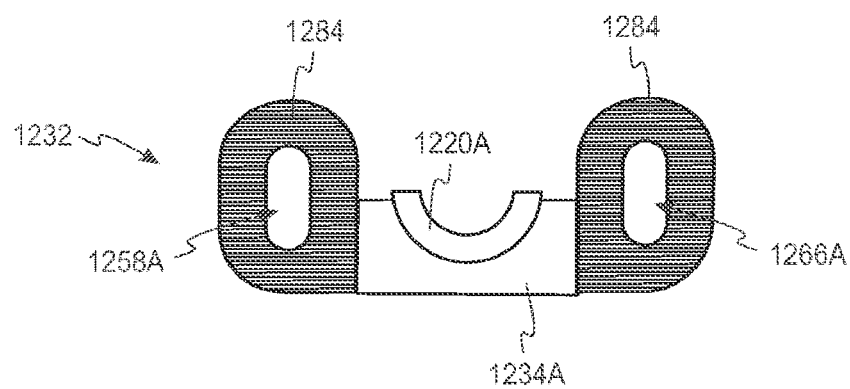
FIG. 12D illustrates an elevation view of a first clamping member of the adjustable clamp system shown in FIG. 12A, according to an example embodiment.
Figure 12E:
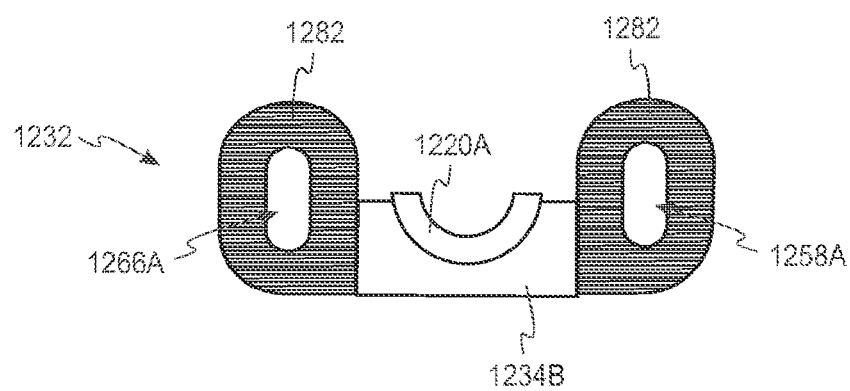
FIG. 12E illustrates another elevation view of a first clamping member of the adjustable clamp system shown in FIG. 12A, according to an example embodiment.
Figure 12F:
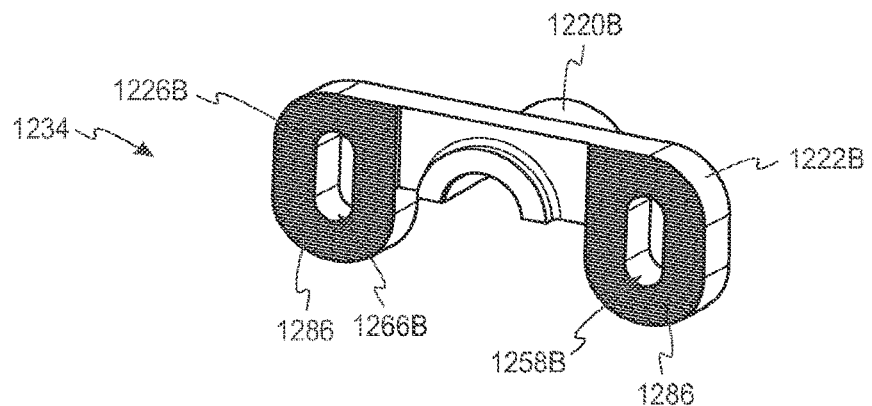
FIG. 12F illustrates a perspective view of a second clamping member of the adjustable clamp system shown in FIG. 12A, according to an example embodiment.
Figure 12G:
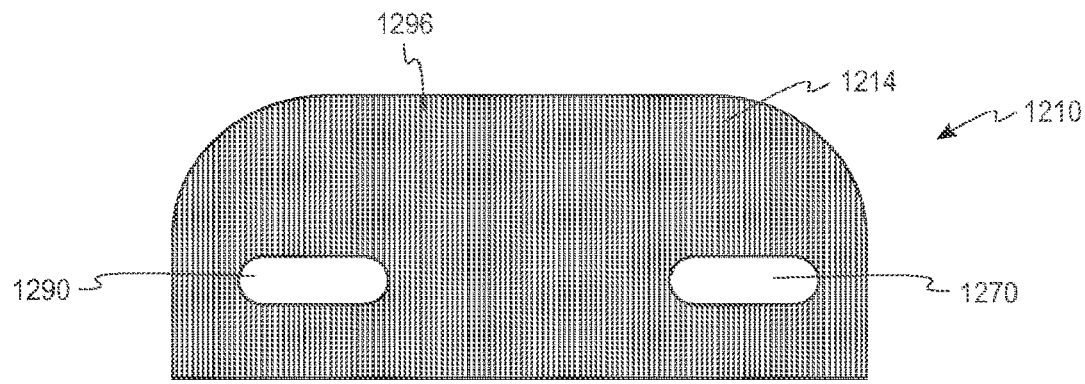
FIG. 12G illustrates an elevation view of the base of the adjustable clamp system shown in FIG. 12A, according to an example embodiment.
Figure 12H:
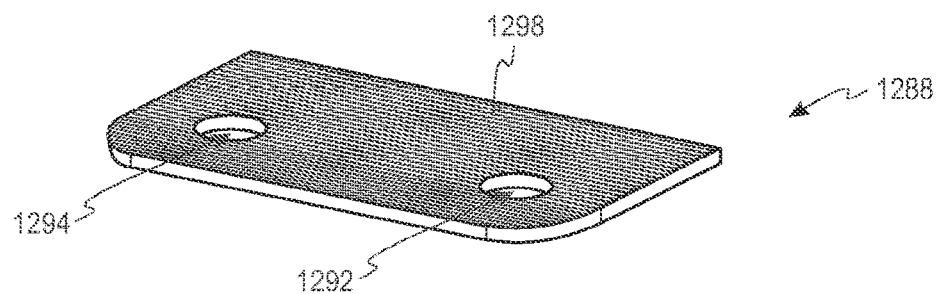
FIG. 12H illustrates a perspective view of a base plate of the adjustable clamp system shown in FIG. 12A, according to an example embodiment.

Referring now to FIGS. 12A-12H, an adjustable clamp system 1200 is depicted according to another example embodiment. In particular, FIG. 12A depicts a perspective view of the adjustable clamp system 1200 in a first state, FIG. 12B depicts a perspective view of the adjustable clamp system 1200 in a second state, FIG. 12C depicts a perspective view of a base 1210 of the adjustable clamp system 1200, FIG. 12D depicts a perspective view of a first side of a first clamping member 1232, FIG. 12E depicts a perspective view of a second side of the first clamping member 1232, FIG. 12F depicts a perspective view of a second clamping member 1234, FIG. 12G depicts a side view of a bottom of the base 1210, and FIG. 12H depicts a perspective view of a base plate 1288.

As shown in FIGS. 12A-12C, the adjustable clamp system 1200 includes the base 1210. The base 1210 includes an anchor portion 1214 that can couple the base 1210 to a support structure, a first clamp-support portion 1216 extending from the anchor portion 1214, a second clamp-support portion 1218 extending from the anchor portion 1214. As shown in FIG. 12C, the first clamp-support portion 1216 can include a first opening 1248 and the second clamp-support portion 1218 can include a second opening 1260. As described in further detail below, the first opening 1248 and the second opening 1260 can facilitate coupling the clamp assembly 1212 to the base 1210.

As shown in FIGS. 12A-12B, the clamp assembly 1212 includes a clamp 1220, a first flange 1222 extending from a first side 1224 of the clamp 1220, and a second flange 1226 extending from a second side 1228 of the clamp 1220. The clamp 1220 defines a bore 1221 in which the clamp 1220 can receive and retain a tube. In some examples, the adjustable clamp system 1200 can include a tubular cushion 1230 in the bore 1221 of the clamp 1220. The tubular cushion 1230 can help to absorb vibrations and/or reduce wear on the clamp 1220 and/or the tube.

The clamp assembly 1212 can also include a first slot 1258 in the first flange 1222 and a second slot 1266 in the second flange 1226. The first slot 1258 and the second slot 1266 can each have a longitudinal axis that extends in a first direction 1240A. As described in further detail below, the first slot 1258 and the second slot 1266 can facilitate translating, in the first direction 1240A, the clamp assembly 1212 relative to the base 1210 to adjust a distance 1242 between the clamp 1220 and the anchor portion 1214 of the base 1210.

As shown in FIGS. 12D-12F, the clamp assembly 1212 can include a first clamping member 1232 and a second clamping member 1234. The first clamping member 1232 can include a first portion 1222A of the first flange 1222, a first portion 1220A of the clamp 1220, and a first portion 1226A of the second flange 1226. The second clamping member 1234 can include a second portion 1222B of the first flange 1222, a second portion 1220B of the clamp 1220, a second portion 1226B of the second flange 1226. In FIGS. 12D-12F, the first portion 1220A of the clamp 1220 can define a bottom half of the clamp 1220 and the second portion 1220B of the clamp 1220 can define a top half of the clamp 1220.

Additionally, the first portion 1222A of the first flange 1222 can define a first portion 1258A of the first slot 1258, and the second portion 1222B of the first flange 1222 can define a second portion 1258B of the first slot 1258. The first portion 1226A of the second flange 1226 can define a first portion 1266A of the second slot 1266, and the second portion 1226B of the second flange 1226 can define a second portion 1266B of the second slot 1266. Accordingly, the first clamping member 1232 and the second clamping member 1234 can each define respective portions 1258A, 1258B of the first slot 1258 and respective portions 1266A, 1266B of the second slot 1266. As described in further detail below, this can facilitate translating the clamp assembly 1212 relative to the base 1210 adjust the distance 1242 between the clamp 1220 and the anchor portion 1214 and/or translating the first clamping member 1232 relative to the second clamping member 1234 to adjust a size (e.g., a diameter 1254) of the bore 1221 of the clamp 1220.

As shown in FIGS. 12A-12B, the adjustable clamp system 1200 includes a plurality of fasteners 1238A, 1238B that can couple, in a first state and a second state, (i) the first flange 1222 of the clamp assembly 1212 to the first clamp-support portion 1216 of the base 1210 and (ii) the second flange 1226 of the clamp assembly 1212 to the second clamp-support portion 1218 of the base 1210. For example, the fasteners 1238A, 1238B can include a first fastener 1238A extending through the first slot 1258 and the first opening 1248 to couple the first flange 1222 of the clamp assembly 1212 to the first clamp-support portion 1216 of the base 1210, and a second fastener 1238B extending through the second slot 1266 and the second opening 1260 to couple the second flange 1226 of the clamp assembly 1212 to the second clamp-support portion 1218 of the base 1210.

As noted above, FIG. 12A depicts the adjustable clamp system 1200 in the first state and FIG. 12B depicts the adjustable clamp system 1200 in the second state. In the first state, the first fastener 1238A and the second fastener 1238B can couple the base 1210, the first clamping member 1232, and the second clamping member 1234 to each other in a manner that allows for translation in the first direction of the clamp assembly 1212 relative to the base 1210. For example, FIG. 12A depicts the first fastener 1238A and the second fastener 1238B after a nut has been threaded on the first fastener 1238A and the second fastener 1238B, but before the nut has been fully tightened. As such, in FIG. 12A, the base 1210, the first clamping member 1232, and the second clamping member 1234 are relatively loosely coupled to each other such that there is a relatively large amount of play in a third direction 1240C between the base 1210, the first clamping member 1232, and the second clamping member 1234.

In the second state shown in FIG. 12B, the first fastener 1238A and the second fastener 1238B can couple the base 1210, the first clamping member 1232, and the second clamping member 1234 to each other in a manner that inhibits (or prevents) translation of the clamp assembly 1212 relative to the base 1210. For example, FIG. 12B depicts the first fastener 1238A and the second fastener 1238B after the nut threaded on the first fastener 1238A and the nut threaded on the second fastener 1238B have been tightened (e.g., fully tightened). As such, in FIG. 12B, the base 1210, the first clamping member 1232, and the second clamping member 1234 are relatively tightly coupled to each other such that there is little (or no) play in the third direction 1240C between the base 1210, the first clamping member 1232, and the second clamping member 1234.

Within examples, the base 1210 and the clamp assembly 1212 include a plurality of serrations 1280, 1282 that define a plurality of positions, along the first direction 1240A, at which the clamp assembly 1212 can be coupled to the base 1210. For instance, as shown in FIG. 12C, the base 1210 includes a plurality of first serrations 1280 on the first clamp-support portion 1216 and the second clamp-support portion 1218. Additionally, as shown in FIG. 12E, the clamp assembly 1212 includes a plurality of second serrations 1282 on the first flange 1222 and the second flange 1226. More particularly, in FIG. 12E, the first clamping member 1232 can include the second serrations 1282 on a first side 1234A of the first clamping member 1232. The first serrations 1280 and the second serrations 1282 each extend in a second direction 1240B, which is orthogonal to the first direction 1240A.

In general, the first serrations 1280 and the second serrations 1282 have respective sizes and shapes that are suitable for the first serrations 1280 to engage with the second serrations 1282 (e.g., the first serrations 1280 can be in a meshing engagement with the second serrations 1282). As one example, the first serrations 1280 and the second serrations 1282 can include respective sets of alternating peaks and valleys. The peaks and valleys can have a common size, a common shape, and/or a uniform distribution. This can assist in defining the plurality of positions at which the clamp assembly 1212 can be coupled to the base 1210 with the second serrations 1282 in meshing engagement with the first serrations 1280.

Within examples, a distance between adjacent positions of the plurality of positions can be defined by a size of each first serration 1280 and a size of each second serration 1282. For instance, in one example, the base 1210 can include 64 first serrations 1280 per inch and the clamp assembly 1212 can include 64 second serrations 1282 per inch such that the first serrations 1280 and the second serrations 1282 define 64 different positions per inch along the first direction 140A. In another example, the first serrations 1280 and/or the second serrations 1282 can be provided at a density of approximately 10 serrations per inch to approximately 80 serrations per inch. In some implementations, the density can be based on a type of installation environment (e.g., an aerospace installation, a terrestrial vehicle installation, a maritime installation, and/or a stationary installation).

As noted above, when the first fastener 1238A and the second fastener 1238B are in the first state, the clamp assembly 1212 is translatable in the first direction 1240A relative to the base 1210 to provide for selection, from among the plurality of positions, of a position of the clamp assembly 1212 relative to the base 1210. For instance, in the first state, the play between the base 1210 and the clamp assembly 1212 in the third direction 1240C can allow for the second serrations 1282 to clear and/or translate over the first serrations 1280 as the clamp assembly 1212 translates relative to the base 1210.

Additionally, in the first state, (i) the first fastener 1238A is translatable in the first slot 1258 in the first direction 1240A and (ii) the second fastener 1238B is translatable in the second slot 1266 in the first direction 1240A. For instance, in the first state, the first fastener 1238A and the second fastener 1238B can be coupled to the base 1210 at respective fixed positions due to the first fastener 1238A extending through the first opening 1248 in the first clamp-support portion 1216 and the second fastener 138B extending through the second opening 1260 in the second clamp-support portion 1218. Because the first slot 1258 and the second slot 1266 have longitudinal axes that are substantially parallel to the first direction 1240A, the first fastener 1238A and the second fastener 1238B can translate in the first slot 1258 and the second slot 1266 as the clamp assembly 1212 translates relative to the base 1210 in the first direction 1240A.

When the first fastener 1238A and the second fastener 1238B are in the second state, the second serrations 1282 engage the first serrations 1280 to retain the clamp assembly 1212 against the base 1210 at the position selected from among the plurality of positions. For example, when the first fastener 1238A and the second fastener 1238B are in the second state, the first fastener 1238A and the second fastener 1238B apply a force (e.g., in the third direction 1240C) to the clamp assembly 1212 and the base 1210 to lock the second serrations 1282 into meshing engagement with the first serrations 1280, which thus inhibits (or prevents) the second serrations 1282 from translating over the first serrations 1280.

As noted above, the first serrations 1280 and the second serrations 1282 extend along the second direction 1240B, which is orthogonal to the first direction 1240A. This can enhance (or maximize) a resistance of the clamp assembly 1212 translating relative to the base 1210 in the second state, which can allow for the first fastener 1238A and the second fastener 1238B to be tightened to a lesser extent while retaining the clamp assembly 1212 at the selected position relative to the base 1210. However, in other examples, the first serrations 1280 and the second serrations 1282 can extend in another direction, which is transverse to the first direction 1240A.

Within examples, by translating the clamp assembly 1212 relative to the base 1210 when the first fastener 1238A and the second fastener 1238B are in the first state, the clamp assembly 1212 can be positioned at a position selected from among the plurality of potential positions defined by the first serrations 1280 and the second serrations 1282. In this way, the clamp assembly 1212 can be translated relative to the base 1210 to adjust the distance 1242 between the clamp 1220 and the anchor portion 1214 of the base 1210. After the clamp assembly 1212 is translated to the selected position, the first fastener 1238A and the second fastener 1238B can be tightened to transition from the first state to the second state and lock the clamp assembly 1212 at the selected position relative to the base 1210.

Also, within examples, the adjustable clamp system 1200 can provide for adjusting the size (e.g., the diameter 1254) of the bore 1221. As shown in FIG. 12D, the first clamping member 1232 can also include a plurality of third serrations 1284 on a second side 1234B of the first clamping member 1232. The second side 1234B of the first clamping member 1232A can be opposite the first side 1234A of the first clamping member 1232A. As shown in FIG. 12F, the second clamping member 1234 can include a plurality of fourth serrations 1286 on a first face 1236A of the second clamping member 1234. When the adjustable clamp system 1200 is assembled, the first face 1236A of the second clamping member 1234 can face the second side 1234B of the first clamping member 1232. The third serrations 1284 and the fourth serrations 1286 can each extend in the second direction 1240B, which is orthogonal to the first direction 1240A.

The third serrations 1284 of the first clamping member 1232 and the fourth serrations 1286 of the second clamping member 1234 can define a plurality of positions of the first clamping member 1232 relative to the second clamping member 1234, and each position can correspond to a respective size of a plurality of sizes of the bore 1221 of the clamp 1220. In general, the third serrations 1284 and the fourth serrations 1286 can have respective sizes and shapes that are suitable for the third serrations 1284 to engage with the fourth serrations 1286 (e.g., the third serrations 1284 can be in a meshing engagement with the fourth serrations 1286). As one example, the third serrations 1284 and the fourth serrations 1286 can include respective sets of alternating peaks and valleys. The peaks and valleys can have a common size, a common shape, and/or a uniform distribution. This can assist in defining a plurality of positions at which the second clamping member 1234 can be coupled to the first clamping member 12334 with the fourth serrations 1286 in meshing engagement with the third serrations 1284.

Within examples, a distance between adjacent sizes of the bore 1221 of the plurality of sizes can be defined by a size of each third serration 1284 and a size of each fourth serration 1286. For instance, in one example, the first clamping member 1232 can include 64 third serrations 1284 per inch and the second clamping member 1234 can include 64 second serrations 1282 per inch such that the third serrations 1284 and the fourth serrations 1286 define 64 different sizes for the bore 1221 per inch along the first direction 1240A. In another example, the third serrations 1284 and/or the fourth serrations 1286 can be provided at a density of approximately 10 serrations per inch to approximately 80 serrations per inch. In some implementations, the density can be based on a type of installation environment (e.g., an aerospace installation, a terrestrial vehicle installation, a maritime installation, and/or a stationary installation).

When the first fastener 1238A and the second fastener 1238B are in the first state, the first clamping member 1232 and the second clamping member 1234 are translatable, in the first direction 1240A, relative to each other. This can provide for selection, from among a plurality of sizes, a size of the bore 1221 of the clamp 1220. For instance, in the first state, play between the first clamping member 1232 and the second clamping member 1234 in the third direction 1240C can allow for the fourth serrations 1286 to clear and/or translate over the third serrations 1284 as the first clamping member 1232 and the second clamping member 1234 translate relative to each other.

Additionally, in the first state, (i) the first fastener 1238A is translatable in the first portion 1258A and/or the second portion 1258B of the first slot 1258 in the first direction 1240A and (ii) the second fastener 1238B is translatable in the first portion 1266A and/or the second portion 1266B of the second slot 1266 in the first direction 1240A. Because the first slot 1258 and the second slot 1266 have longitudinal axes that are substantially parallel to the first direction 1240A, the first fastener 1238A and the second fastener 1238B can translate in the portions 1258A, 1258B, 1266A, 1266B of the first slot 1258 and the second slot 1266 as the first clamping member 1232 and the second clamping member 1234 translate relative to each other in the first direction 1240A.

When the first fastener 1238A and the second fastener 1238B are in the second state, the third serrations 1284 engage the fourth serrations 1286 to lock the bore 1221 at the size selected from among the plurality of sizes. For example, when the first fastener 1238A and the second fastener 1238B are in the second state, the first fastener 1238A and the second fastener 1238B apply a force (e.g., in the third direction 1240C) to the first clamping member 1232 and the second clamping member 1234 to lock the fourth serrations 1286 into meshing engagement with the third serrations 1284, which thus inhibits (or prevents) the fourth serrations 1286 from translating over the third serrations 1284.

As noted above, the third serrations 1284 and the fourth serrations 1286 can extend along the second direction 1240B, which is orthogonal to the first direction 1240A. This can enhance (or maximize) a resistance of the first clamping member 1232 and the second clamping member 1234 translating relative to each other in the second state, which can allow for the first fastener 1238A and the second fastener 1238B to be tightened to a lesser extent while retaining the bore 1221 at the selected size. However, in other examples, the third serrations 1284 and the fourth serrations 1286 can extend in another direction, which is transverse to the first direction 1240A.

Within examples, by translating the first clamping member 1232 and the second clamping member 1234 relative to each other when the first fastener 1238A and the second fastener 1238B are in the first state, the size of the bore 1221 can be set at a size selected from among the plurality of potential sizes defined by the third serrations 1284 and the fourth serrations 1286. In this way, the first clamping member 1232 and the second clamping member 1234 can be translated relative to each other to adjust the size (e.g., the diameter 1254) of the bore 1221. After the first clamping member 1232 and the second clamping member 1234 are translated to select the size of the bore 121, the first fastener 1238A and the second fastener 1238B can be tightened to transition from the first state to the second state and lock the bore 1221 at the selected size.

Within examples, the adjustable clamp system 1200 can additionally or alternatively provide for adjusting a base position of the base 1210 and the clamp assembly 1212 along the second direction 1240B (i.e., relative to a support structure). In FIGS. 12A-12B, the base 1210 can be coupled to a base plate 1288 to provide for the adjustability of the base 1210 and the clamp assembly 1212 along the second direction 1240B.

As shown in FIGS. 12C and 12G, the anchor portion 1214 of the base 1210 can include a third slot 1270 and a fourth slot 1290, which each have a longitudinal axis extending in the third direction 1240C. Additionally, as shown in FIG. 12H, the base plate 1288 can include a third opening 1292 and a fourth opening 1294. The base 1210 can be arranged relative to the base plate 1288 such that the third slot 1270 is aligned with the third opening 1292 and the fourth slot 1290 is aligned with the fourth opening 1294.

As shown in FIGS. 12A-12B, the adjustable clamp system 1200 can include a plurality of base fasteners 1238C, 1238D that can couple, in a first state and a second state, the anchor portion 1214 of the base 1210 to the base plate 1288. For example, the base fasteners 1238C, 1238D can include a third fastener 1238C extending through the third slot 1270 and the third opening 1292, and a fourth fastener 1238D extending through the fourth slot 1290 and the fourth opening 1294 to couple the anchor portion 1214 of the base 1210 to the base plate 1288. Additionally, the third fastener 1238C and the fourth fastener 1238D can couple the base 1210 to the support structure.

In the first state, the third fastener 1238C and the fourth fastener 1238D can couple the base 1210, the base plate 1288, and the support structure to each other in a manner that allows for translation in the second direction 1240B of the base 1210 and the clamp assembly 1212 relative to the base plate 1288. For example, FIG. 12A depicts the third fastener 1238C and the fourth fastener 1238D after a nut has been threaded on the third fastener 1238C and the fourth fastener 1238D, but before the nut has been fully tightened. As such, in FIG. 12A, the base 1210, the base plate 1288, and the support structure are relatively loosely coupled to each other such that there is a relatively large amount of play in the first direction 1240A between the base 1210, the base plate 1288, and the support structure.

In the second state shown in FIG. 12B, the third fastener 1238C and the fourth fastener 1238D can couple the base 1210, the base plate 1288, and the support structure to each other in a manner that inhibits (or prevents) translation of the base 1210 relative to the base plate 1288. For example, FIG. 12B depicts the third fastener 1238C and the fourth fastener 1238D after the nut threaded on the third fastener 1238C and the nut threaded on the fourth fastener 1238D have been tightened (e.g., fully tightened). As such, in FIG. 12B, the base 1210, the base plate 1288, and the support structure are relatively tightly coupled to each other such that there is little (or no) play in the first direction 1240A between the base 1210, the base plate 1288, and the support structure.

As shown in FIGS. 12G and 12H, the base 1210 can include a plurality of fifth serrations 1296 on the anchor portion 1214 of the base 1210, and the base plate 1288 can include a plurality of sixth serrations 1298 for engaging the fifth serrations 1296. The fifth serrations 1296 and the sixth serrations 1298 can each extend in the third direction 1240C, which is orthogonal to the second direction 1240B.

The fifth serrations 1296 of the base 1210 and the sixth serrations 1298 of the base plate 1288 can define a plurality of base positions of the base 1210 and the clamp assembly 1212 relative to the base plate 1288 and the support structure. In general, the fifth serrations 1296 and the sixth serrations 1298 can have respective sizes and shapes that are suitable for the fifth serrations 1296 to engage with the sixth serrations 1298 (e.g., the fifth serrations 1296 can be in a meshing engagement with the sixth serrations 1298). As one example, the fifth serrations 1296 and the sixth serrations 1298 can include respective sets of alternating peaks and valleys. The peaks and valleys can have a common size, a common shape, and/or a uniform distribution. This can assist in defining a plurality of base positions at which the base 1210 can coupled to base plate 1288 with the fifth serrations 1296 in meshing engagement with the sixth serrations 1298.

Within examples, a distance between adjacent base positions can be defined by a size of each fifth serration 1296 and a size of each sixth serration 1298. For instance, in one example, the base 1210 can include 64 fifth serrations 1296 per inch and the base plate 1288 can include 64 sixth serrations 1298 per inch such that the fifth serrations 1296 and the sixth serrations 1298 define 64 different base positions per inch along the second direction 1240B. In another example, the fifth serrations 1296 and/or the sixth serrations 1298 can be provided at a density of approximately 10 serrations per inch to approximately 80 serrations per inch. In some implementations, the density can be based on a type of installation environment (e.g., an aerospace installation, a terrestrial vehicle installation, a maritime installation, and/or a stationary installation).

When the third fastener 1238C and the fourth fastener 1238D are in the first state, the base 1210 is translatable in the second direction 1240B relative to the base plate 1288 to select, from among the plurality of base positions, a base position of the base 1210 relative to the base plate 1288. For instance, in the first state, play between the anchor portion 1214 of the base 1210 and the base plate 1288 in the first direction 1240A can allow for the fifth serrations 1296 to clear and/or translate over the sixth serrations 1296 as the base 1210 translates relative to the base plate 1288.

Additionally, in the first state of the base fasteners 1238C, 1238D, (i) the third fastener 1238C is translatable in the third slot 1270 in the second direction 1240B and (ii) the fourth fastener 1238D is translatable in the fourth slot 1290 in the second direction 1240B. Because the third slot 1270 and the fourth slot 1290 have longitudinal axes that are substantially parallel to the second direction 1240B, the third fastener 1238C and the fourth fastener 1238D can translate in the third slot 1270 and the fourth slot 1290 as the base 1210 translates relative to the base plate 1288 in the second direction 1240B.

When the third fastener 1238C and the fourth fastener 1238D are in the second state, the fifth serrations 1296 engage the sixth serrations 1298 to lock the base 1210 at the selected base position relative to the base plate 1288. For example, when the third fastener 1238C and the fourth fastener 1238D are in the second state, the third fastener 1238C and the fourth fastener 1238D can apply a force (e.g., in the first direction 1240A) to the base 1210 and the base plate 1288 to lock the fifth serrations 1296 into meshing engagement with the sixth serrations 1298, which thus inhibits (or prevents) the fifth serrations 1296 from translating over the sixth serrations 1298.

As noted above, the fifth serrations 1296 and the sixth serrations 1298 can extend along the third direction 1240C, which is orthogonal to the second direction 1240B. This can enhance (or maximize) a resistance of the base 1210 translating in the second direction 1240B relative to the base plate 1288 in the second state, which can allow for the third fastener 1238C and the fourth fastener 1238D to be tightened to a lesser extent while retaining the base 1210 at the selected base position. However, in other examples, the fifth serrations 1296 and the sixth serrations 1298 can extend in another direction, which is transverse to the second direction 1240B.

Within examples, by translating the base 1210 relative to the base plate 1288 when the third fastener 1238C and the fourth fastener 1238D are in the first state, the position of the base 1210 and the clamp assembly 1212 can be selected from among the plurality of potential base positions in the second direction 1240B defined by the fifth serrations 1296 and the sixth serrations 1298. In this way, the base 1210 and the clamp assembly 1212 can be shifted laterally to, for instance, accommodate a non-linear path of a tube and/or to align the bores 1221 of a plurality of adjustable clamp systems 1200. After the base 1210 and the base plate 1288 are translated to select the base position, the third fastener 1238C and the fourth fastener 1238D can be tightened to transition from the first state to the second state and lock the base 1210 at the selected base position relative to the base plate 1288.

Figure 13:
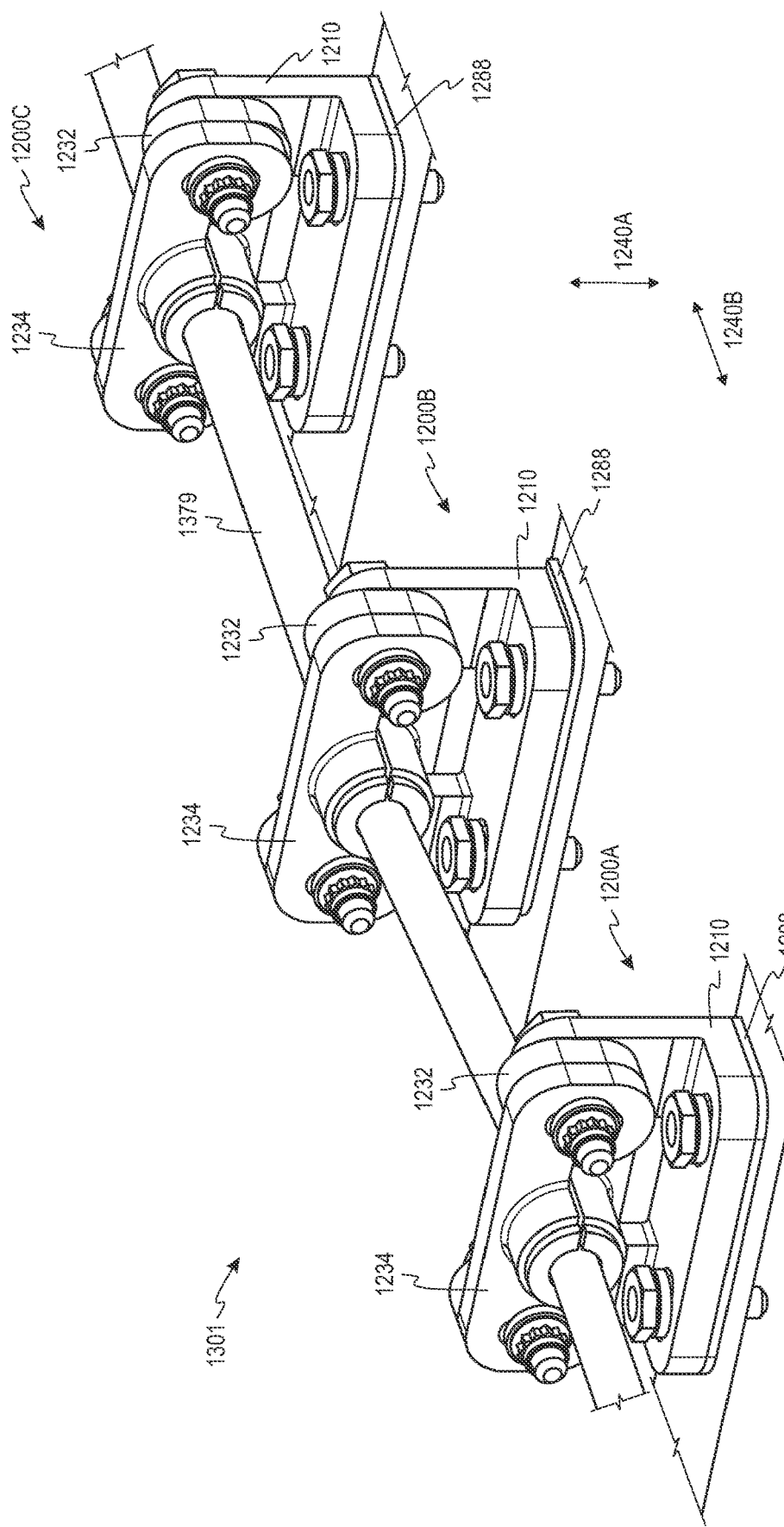
FIG. 13 illustrates a plurality of adjustable clamp systems coupling a tube to a support structure, according to another example embodiment.

FIG. 13 depicts a system 1301 including a plurality of adjustable clamp systems 1200A-1200C coupling to a tube 1379 to a support structure 1378 according to an example embodiment. The adjustable clamp systems 1200A-1200C include a first adjustable clamp system 1200A, a second adjustable clamp system 1200B, and a third adjustable clamp system 1200C. The adjustable clamp systems 1200A-1200C are identical to the adjustable clamp system 1200 described above with respect to FIGS. 12A-12H. However, one or more of the first clamping members 1232, the second clamping members 1234, the bases 1210, and/or the base plates 1288 of the first adjustable clamp system 1200A, the second adjustable clamp system 1200B, and the third adjustable clamp system 1200C are in different respective positions to accommodate variations in one or more dimensions of the tube 1379, a location of pre-drilled holes in the support structure 1378, and/or structural variations in the support structure (e.g., a non-level surface of the support structure).

For instance, in FIG. 13, the second adjustable clamp system 1200B can be vertically adjusted in the first direction 1240A and laterally adjusted in the second direction 1240B relative to the first adjustable clamp system 1200A. Additionally, for instance, the third adjustable clamp system 1200C can be adjusted to a larger bore than the second adjustable clamp system 1200B. Other examples are also possible.

Figure 14A:
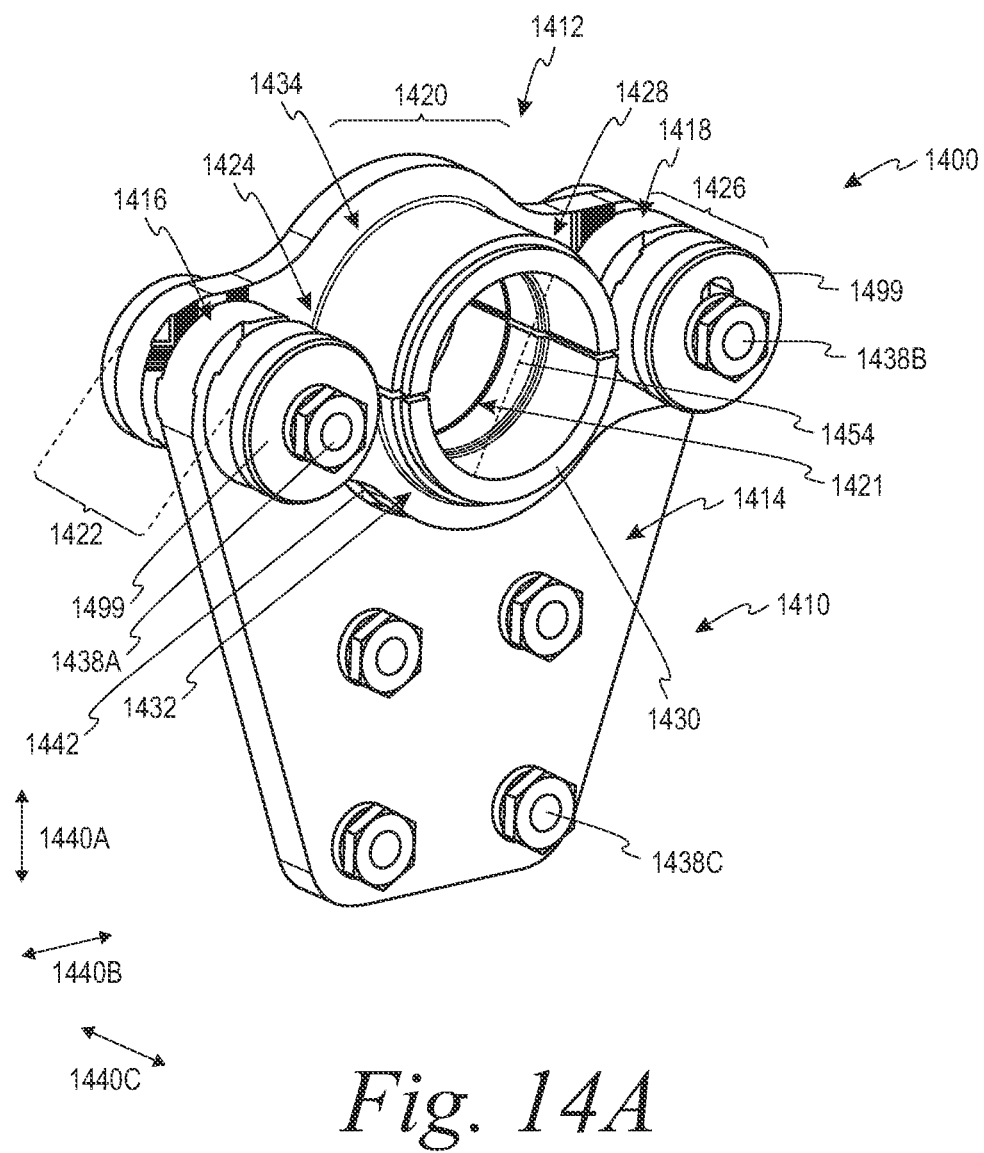
FIG. 14A illustrates a perspective view of an adjustable clamp system in a first state, according to another example embodiment.
Figure 14B:
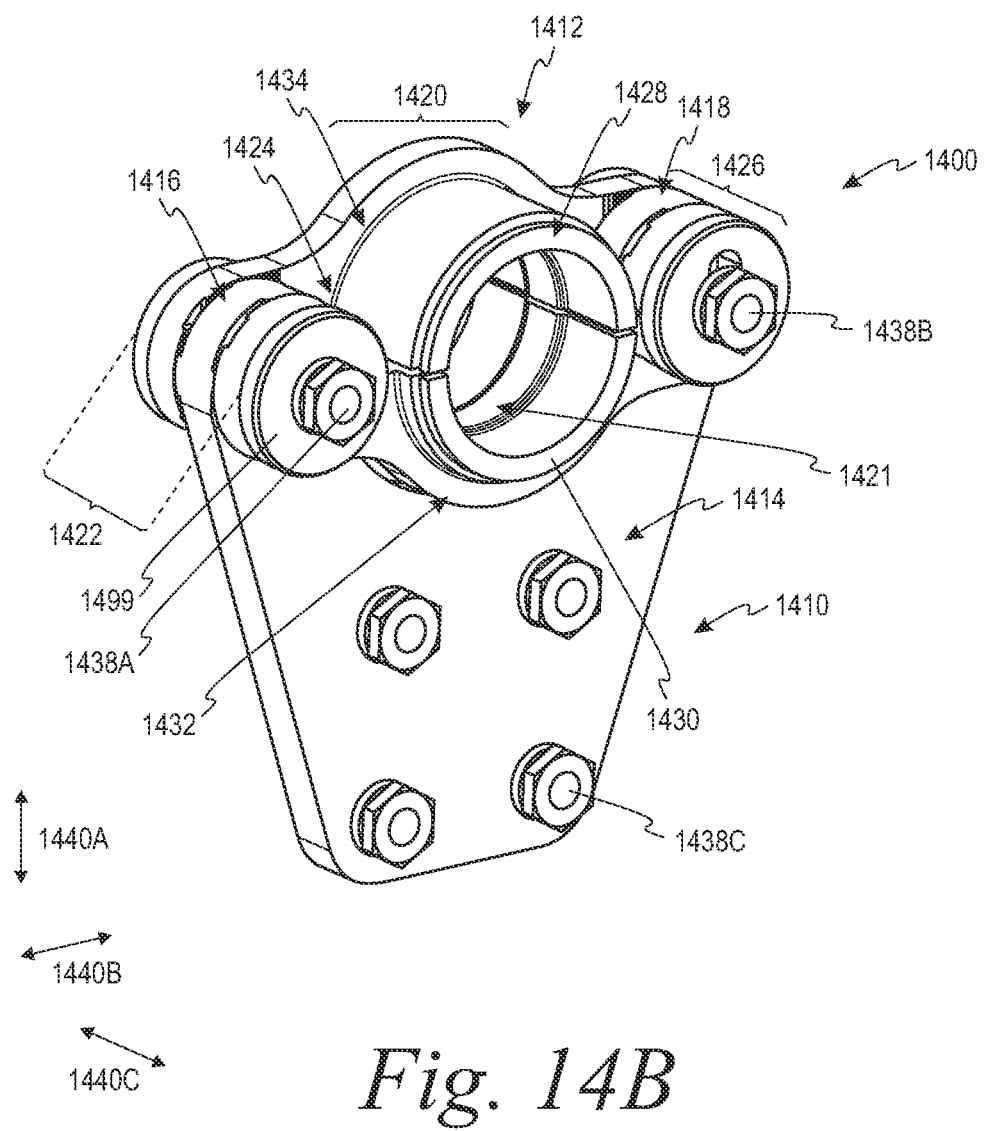
FIG. 14B illustrates a perspective view of the adjustable clamp system of FIG. 12A in a second state, according to an example embodiment.
Figure 14E:
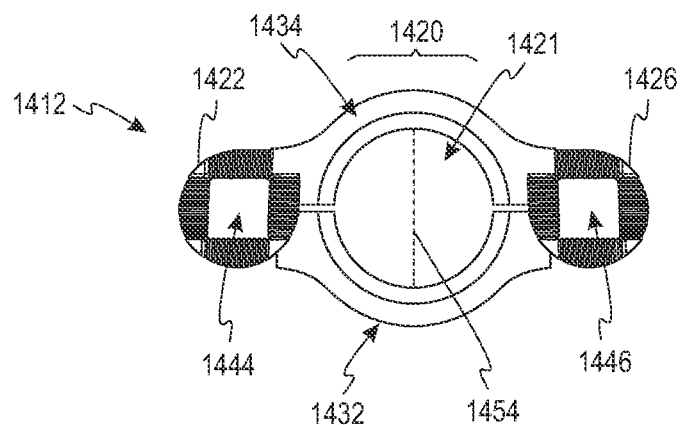
FIG. 14E illustrates an elevation view of a clamp assembly of the adjustable clamp system shown in FIG. 14A, according to an example embodiment.
Figure 14F:
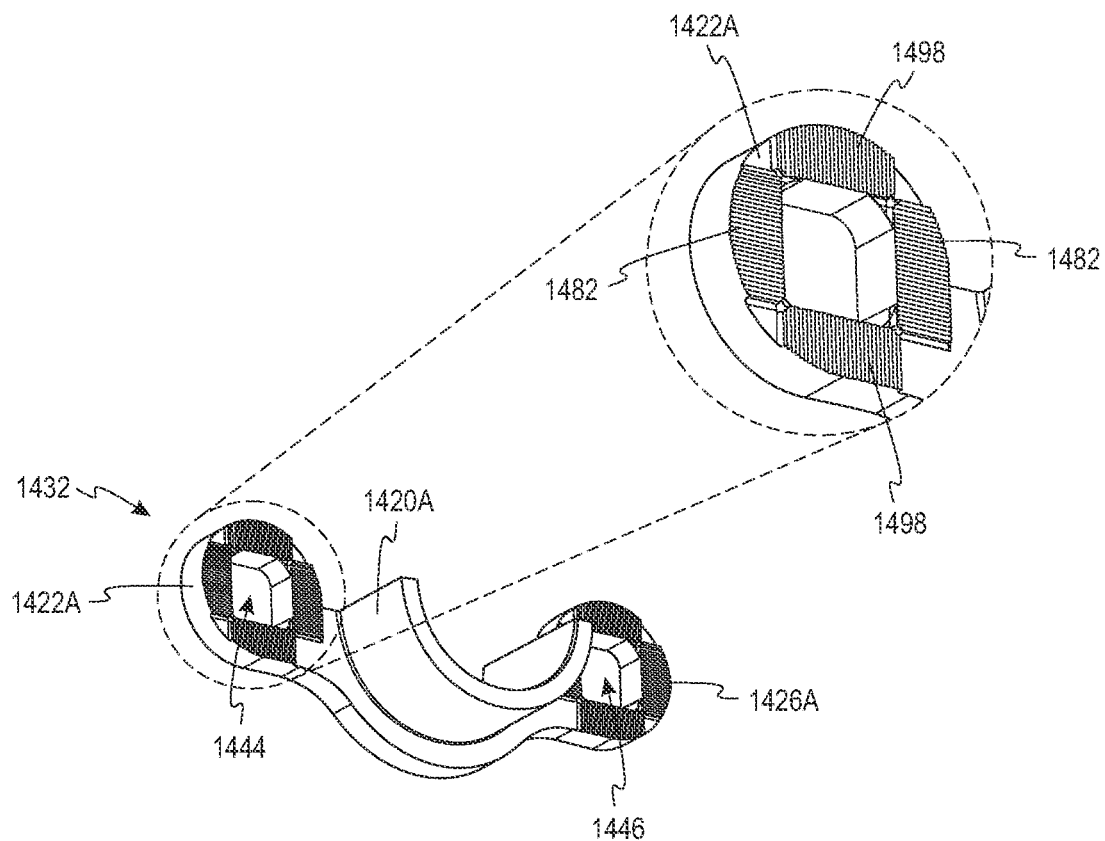
FIG. 14F illustrates a perspective view of a first clamping member of the adjustable clamp system shown in FIG. 14A, according to an example embodiment.

Referring now to FIGS. 14A-14F, an adjustable clamp system 1400 is depicted according to another example embodiment. In particular, FIG. 14A depicts a perspective view of the adjustable clamp system 1400 in a first state, FIG. 14B depicts a perspective view of the adjustable clamp system 1400 in a second state, FIG. 14C depicts a perspective view of a base 1410 of the adjustable clamp system 1400, FIG. 14D depicts another perspective view of the base 1410, FIG. 14E depicts a perspective view of a first clamping member 1432, and FIG. 14F depicts a perspective view of a second clamping member 1434.

As shown in FIGS. 14A-14C, the adjustable clamp system 1400 includes the base 1410 and a clamp assembly 1412. The base 1410 includes an anchor portion 1414 that can couple the base 1410 to a support structure, a first clamp-support portion 1416 extending from the anchor portion 1414, a second clamp-support portion 1418 extending from the anchor portion 1414. In FIGS. 14A-14C, the anchor portion 1414 is coplanar with the first clamp-support portion 1416 and the second clamp-support portion 1418 of the base 1410. This can assist in coupling the base 1410 to a support structure having a surface, which is parallel to the base 1410. However, in other examples, the anchor portion 1414 can be orthogonal to the first clamp-support portion 1416 and the second clamp-support portion 1418 (e.g., as shown in FIG. 12C). As shown in FIGS. 14A-14B, the adjustable clamp system 1400 can include a plurality of base fasteners 1438C for coupling the anchor portion 1414 to the support structure.

As shown in FIG. 14C, the first clamp-support portion 1416 can include a first opening 1448 and the second clamp-support portion 1418 can include a second opening 1460. As described in further detail below, the first opening 1448 and the second opening 1460 can facilitate coupling the clamp assembly 1412 to the base 1410.

As shown in FIGS. 14A-14B and 14E, the clamp assembly 1412 includes a clamp 1420, a first flange 1422 extending from a first side 1424 of the clamp 1420, and a second flange 1426 extending from a second side 1428 of the clamp 1420. The clamp 1420 defines a bore 1421 in which the clamp 1420 can receive and retain a tube. In some examples, the adjustable clamp system 1400 can include a tubular cushion 1430 in the bore 1421 of the clamp 1420. The tubular cushion 1430 can help to absorb vibrations and/or reduce wear on the clamp 1420 and/or the tube.

As shown in FIG. 14E, the clamp assembly 1412 can also include a first aperture 1444 in the first flange 1422 and a second aperture 1466 in the second flange 1426. As described in further detail below, the first aperture 1444 and the second aperture 1446 can facilitate translating, in a first direction 1440A and a second direction 1440B, the clamp assembly 1412 relative to the base 1410.

As shown in FIGS. 14A-14B and 14E-14G, the clamp assembly 1412 can include a first clamping member 1432 and a second clamping member 1434. The first clamping member 1432 can include a first portion 1422A of the first flange 1422, a first portion 1420A of the clamp 1420, and a first portion 1426A of the second flange 1426. The second clamping member 1434 can include a second portion 1422B of the first flange 1422, a second portion 1420B of the clamp 1420, a second portion 1426B of the second flange 1426. In FIGS. 14A-14B and 14E-14G, the first portion 1420A of the clamp 1420 can define a bottom half of the clamp 1420 and the second portion 1420B of the clamp 1420 can define a top half of the clamp 1420.

As shown in FIGS. 14A-14B, the adjustable clamp system 1400 includes a plurality of fasteners 1438A, 1438B that can couple, in a first state and a second state, (i) the first flange 1422 of the clamp assembly 1412 to the first clamp-support portion 1416 of the base 1410 and (ii) the second flange 1426 of the clamp assembly 1412 to the second clamp-support portion 1418 of the base 1410. For example, the fasteners 1438A, 1438B can include a first fastener 1438A extending through the first aperture 1444 and the first opening 1448 to couple the first flange 1422 of the clamp assembly 1412 to the first clamp-support portion 1416 of the base 1410, and a second fastener 1438B extending through the second aperture 1446 and the second opening 1460 to couple the second flange 1426 of the clamp assembly 1412 to the second clamp-support portion 1418 of the base 1410.

As shown in FIGS. 14A-14D, the first clamping member 1432 can be coupled to a first side 1410A of the base 1410, and the second clamping member 1434 can be coupled to a second side 1410B of the base 1410. However, in other examples, the first clamping member 1432 and the second clamping member 1434 both can be coupled to the first side 1410A (e.g., in manner similar to that shown in FIGS. 12A-12B). Also, in FIGS. 14A-14B, the adjustable clamp system 1400 includes a plurality of washers 1499 to facilitate coupling first clamping member 1432 and the second clamping member 1434 to the base 1410. The washers 1499 can help to distribute pressure of the fasteners 1438A, 1438B (and/or a nut) more evenly over the first portion 1422A of the first flange 1422, the second portion 1422B of the first flange 1422, the first portion 1426A of the second flange 1426, and/or the second portion 1426B of the second flange 1426.

As noted above, FIG. 14A depicts the adjustable clamp system 1400 in the first state and FIG. 14B depicts the adjustable clamp system 1400 in the second state. In the first state, the first fastener 1438A and the second fastener 1438B can couple the base 1410, the first clamping member 1432, and the second clamping member 1434 to each other in a manner that allows for translation in the first direction of the clamp assembly 1412 relative to the base 1410. For example, FIG. 14A depicts the first fastener 1438A and the second fastener 1438B after a nut has been threaded on the first fastener 1438A and the second fastener 1438B, but before the nut has been fully tightened. As such, in FIG. 14A, the base 1410, the first clamping member 1432, and the second clamping member 1434 are relatively loosely coupled to each other such that there is a relatively large amount of play in a third direction 1440C between the base 1410, the first clamping member 1432, and the second clamping member 1434.

In the second state shown in FIG. 14B, the first fastener 1438A and the second fastener 1438B can couple the base 1410, the first clamping member 1432, and the second clamping member 1434 to each other in a manner that inhibits (or prevents) translation of the clamp assembly 1412 relative to the base 1410. For example, FIG. 14B depicts the first fastener 1438A and the second fastener 1438B after the nut threaded on the first fastener 1438A and the nut threaded on the second fastener 1438B have been tightened (e.g., fully tightened). As such, in FIG. 14B, the base 1410, the first clamping member 1432, and the second clamping member 1434 are relatively tightly coupled to each other such that there is little (or no) play in the third direction 1440C between the base 1410, the first clamping member 1432, and the second clamping member 1434.

Within examples, the base 1410 and the clamp assembly 1412 include a plurality of serrations that provide for adjusting a distance 1442 of the clamp assembly 1412 relative to the anchor portion 1414 of the base 1410, a size (e.g., a diameter) of the bore 1421 of the clamp 1420, and/or a lateral position of the clamp assembly 1412 relative to the base 1410. For instance, as shown in FIGS. 14C-14D, the base 1410 includes a plurality of first serrations 1480 and a plurality of third serrations 1484 on the first clamp-support portion 1416 and the second clamp-support portion 1418. In particular, as shown in FIG. 14C, the first serrations 1480 are on a first side 1410A of the base 1410 and, as shown in FIG. 14D, the third serrations 1484 are on a second side 1410B of the base 1410. The first serrations 1480 and the third serrations 1484 each extend in a second direction 1440B, which is orthogonal to the first direction 1440A.

Additionally, as shown in FIGS. 14C-14D, the base 1410 can include a plurality of fifth serrations 1496 on the first clamp-support portion 1416 and the second clamp-support portion 1418 of the base 1410. For instance, a first portion of the fifth serrations 1496 can be on a first side 1410A of the base 1410 shown in FIG. 14C, and a second portion of the fifth serrations are 1496 can be on a second side 1410B of the base 1410 shown in FIG. 14D. As shown in FIGS. 14C-14D, the fifth serrations 1496 can extend in the first direction 1440A. Accordingly, the fifth serrations 1496 can be orthogonal to the first serrations 1480 and the third serrations 1484 of the base 1410.

Figure 14G:
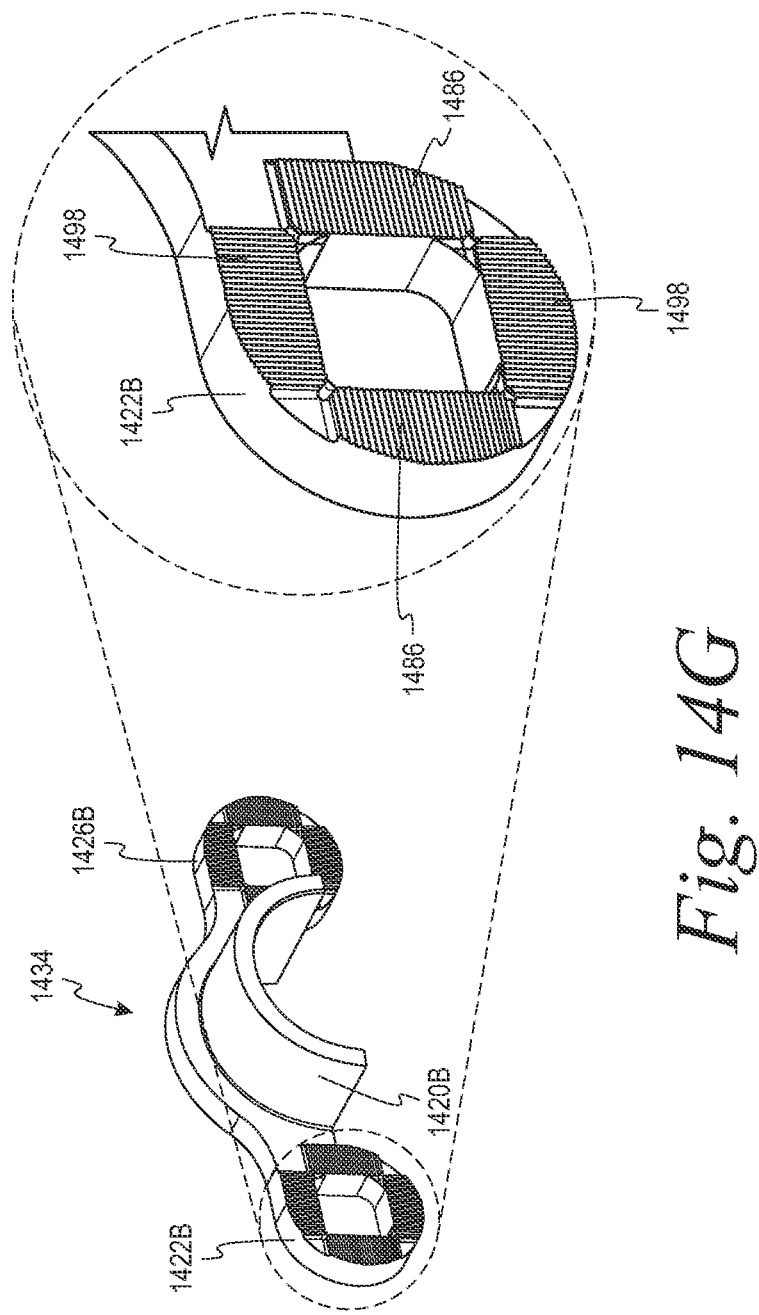
FIG. 14G illustrates a perspective view of a second clamping member of the adjustable clamp system shown in FIG. 14A, according to an example embodiment.

As shown in FIGS. 14F-14G, the clamp assembly 1412 can include a plurality of second serrations 1482 and a plurality of fourth serrations 1486 on the first flange 1422 and the second flange 1426. For instance, as shown in FIG. 14F, the first clamping member 1432 can include the second serrations 1482 and, as shown in FIG. 14G, the second clamping member 1434 can include the fourth serrations 1486. The second serrations 1482 and the fourth serrations 1486 each extend in the second direction 1440B, which is orthogonal to the first direction 1440A.

Additionally, as shown in FIGS. 14F-14G, the clamp assembly 1412 can include a plurality of sixth serrations 1498 on the first flange 1422 and the second flange 1426 of the clamp assembly 1412. For instance, a first portion of the sixth serrations 1498 can be on the first clamping member 1432 shown in FIG. 14F, and a second portion of the sixth serrations are 1498 can be on the second clamping member 1434 shown in FIG. 14G. As shown in FIGS. 14F-14G, the sixth serrations 1498 can extend in the first direction 1430A. Accordingly, the sixth serrations 1498 can be orthogonal to the second serrations 1482 and the fourth serrations 1486 of the clamp assembly 1412.

When the first fastener 1438A and the second fastener 1438B are in the first state, the clamp assembly 1412 is translatable in the first direction 1440A relative to the base 1410 to provide for selection, from among the plurality of positions, of a position of the clamp assembly 1412 relative to the base 1410. For instance, in the first state, the play between the base 1410 and the clamp assembly 1412 in the third direction 1440C can allow for the second serrations 1482 to clear and/or translate over the first serrations 1480 as the first clamping member 1432 of the clamp assembly 1412 translates relative to the base 1410.

Within examples, a distance between adjacent positions of the plurality of positions can be defined by a size of each first serration 1480 and a size of each second serration 1482. For instance, in one example, the base 1410 can include 64 first serrations 1480 per inch and the clamp assembly 1412 can include 64 second serrations 1482 per inch such that the first serrations 1480 and the second serrations 1482 define 64 different positions per inch along the first direction 1440A. In another example, the first serrations 1480 and/or the second serrations 1482 can be provided at a density of approximately 10 serrations per inch to approximately 80 serrations per inch. In some implementations, the density can be based on a type of installation environment (e.g., an aerospace installation, a terrestrial vehicle installation, a maritime installation, and/or a stationary installation).

When the first fastener 1438A and the second fastener 1438B are in the second state, the second serrations 1482 engage the first serrations 1480 to retain the first clamping member 1432 of the clamp assembly 1412 against the base 1410 at the position selected from among the plurality of positions. For example, when the first fastener 1438A and the second fastener 1438B are in the second state, the first fastener 1438A and the second fastener 1438B apply a force (e.g., in the third direction 1440C) to the first clamping member 1432 of the clamp assembly 1412 and the base 1410 to lock the second serrations 1482 into meshing engagement with the first serrations 1480, which thus inhibits (or prevents) the second serrations 1482 from translating over the first serrations 1480.

As noted above, the first serrations 1480 and the second serrations 1482 extend along the second direction 1440B, which is orthogonal to the first direction 1440A. This can enhance (or maximize) a resistance of the first clamping member 1432 of the clamp assembly 1412 translating relative to the base 1410 in the second state, which can allow for the first fastener 1438A and the second fastener 1438B to be tightened to a lesser extent while retaining the clamp assembly 1412 at the selected position relative to the base 1410. However, in other examples, the first serrations 1480 and the second serrations 1482 can extend in another direction, which is transverse to the first direction 1440A.

Within examples, by translating the first clamping member 1432 of the clamp assembly 1412 relative to the base 1410 when the first fastener 1438A and the second fastener 1438B are in the first state, the clamp assembly 1412 can be positioned at a position selected from among the plurality of potential positions defined by the first serrations 1480 and the second serrations 1482. In this way, the clamp assembly 1412 can be translated relative to the base 1410 to adjust the distance 1442 between the clamp 1420 and the anchor portion 1414 of the base 1410. After the first clamping member 1432 of the clamp assembly 1412 is translated to the selected position, the first fastener 1438A and the second fastener 1438B can be tightened to transition from the first state to the second state and lock the first clamping member 1432 of the clamp assembly 1412 at the selected position relative to the base 1410.

When the first fastener 1438A and the second fastener 1438B are in the first state, the second clamping member 1434 is translatable, in the first direction 1440A, relative to the first clamping member 1432. This can provide for selection, from among a plurality of sizes, a size of the bore 1421 of the clamp 1420. For instance, in the first state, play between the second clamping member 1434 relative to the base 1410 in the third direction 1440C can allow for the fourth serrations 1486 to clear and/or translate over the third serrations 1484 as the second clamping member 1434 translates relative to the base 1410 and the first clamping member 1432.

Within examples, a distance between adjacent sizes of the bore 1421 of the plurality of sizes can be defined by a size of each third serration 1484 and a size of each fourth serration 1486. For instance, in one example, the base 1410 can include 64 third serrations 1484 per inch and the second clamping member 1434 can include 64 fourth serrations 1486 per inch such that the third serrations 1484 and the fourth serrations 1486 define 64 different sizes for the bore 1421 per inch along the first direction 1440A. In another example, the third serrations 1484 and/or the fourth serrations 1486 can be provided at a density of approximately 10 serrations per inch to approximately 80 serrations per inch. In some implementations, the density can be based on a type of installation environment (e.g., an aerospace installation, a terrestrial vehicle installation, a maritime installation, and/or a stationary installation).

When the first fastener 1438A and the second fastener 1438B are in the second state, the third serrations 1484 engage the fourth serrations 1486 and the first serrations 1480 engage the second serrations 1482 to lock the bore 1421 at the size selected from among the plurality of sizes. For example, when the first fastener 1438A and the second fastener 1438B are in the second state, the first fastener 1438A and the second fastener 1438B apply a force (e.g., in the third direction 1440C) to the second clamping member 1434 and the base 1410 to lock the fourth serrations 1486 into meshing engagement with the third serrations 1484, which thus inhibits (or prevents) the fourth serrations 1486 from translating over the third serrations 1484. Additionally, as described above, when the first fastener 1438A and the second fastener 1438B are in the second state, the first fastener 1438A and the second fastener 1438B apply a force (e.g., in the third direction 1440C) to the first clamping member 1432 and the base 1410 to lock the second serrations 1482 into meshing engagement with the first serrations 1480, which thus inhibits (or prevents) the second serrations 1482 from translating over the first serrations 1480.

As noted above, the third serrations 1484 and the fourth serrations 1486 can extend along the second direction 1440B, which is orthogonal to the first direction 1440A. This can enhance (or maximize) a resistance of the second clamping member 1434 translating relative to the first clamping member 1432 in the second state, which can allow for the first fastener 1438A and the second fastener 1438B to be tightened to a lesser extent while retaining the bore 1441 at the selected size. However, in other examples, the third serrations 1484 and the fourth serrations 1486 can extend in another direction, which is transverse to the first direction 1440A.

Within examples, by translating the second clamping member 1434 relative to the first clamping member 1432 when the first fastener 1438A and the second fastener 1438B are in the first state, the size of the bore 1421 can be set at a size selected from among the plurality of potential sizes defined by the third serrations 1484 and the fourth serrations 1486. In this way, the first clamping member 1432 and the second clamping member 1434 can be translated relative to each other to adjust the size (e.g., the diameter 1454) of the bore 1421. After the first clamping member 1432 and the second clamping member 1434 are translated to select the size of the bore 1421, the first fastener 1438A and the second fastener 1438B can be tightened to transition from the first state to the second state and lock the bore 1421 at the selected size.

When the first fastener 1438A and the second fastener 1438B are in the first state, the clamp assembly 1412 is translatable, in the second direction 1440B, relative to the base 1410. This can provide for selection, from among a plurality of lateral positions, a lateral position of the clamp assembly 1412 relative to the base 1410. The lateral positions can be defined by the fifth serrations 1496 of the base 1410 and the sixth serrations 1498 of the clamp assembly 1412.

As shown in FIGS. 14C-14D, the first side 1410A of the base 1410 includes a first portion of the fifth serrations 1496 and the second side 1410B of the base 1410 includes a second portion of the fifth serrations 1496. Additionally, as shown in FIGS. 14F-14G, the first clamping member 1432 includes a first portion of the plurality of sixth serrations 1498 and the second clamping member 1434 includes a second portion of the plurality of sixth serrations 1498.

In this arrangement, when the first fastener 1438A and the second fastener 1438B are in the first state, play between the first clamping member 1432 and the second clamping member 1434 relative to the base 1410 in the third direction 1440C can allow for (i) the first portion of the fifth serrations 1496 to clear and/or translate over the first portion of the sixth serrations 1498 as the first clamping member 1432 translates relative to the base 1410, and (ii) the second portion of the fifth serrations 1496 to clear and/or translate over the second portion of the sixth serrations 1496 as the second clamping member 1434 translates relative to the base 1410.

Within examples, a distance between adjacent lateral positions can be defined by a size of each fifth serration 1496 and a size of each sixth serration 1498. For instance, in one example, the base 1410 can include 64 fifth serrations 1496 per inch and the clamp assembly 1412 can include 64 sixth serrations 1498 per inch such that the fifth serrations 1496 and the sixth serrations 1498 define 64 different lateral positions per inch along the second direction 1440B. In another example, the fifth serrations 1496 and/or the sixth serrations 1498 can be provided at a density of approximately 10 serrations per inch to approximately 80 serrations per inch. In some implementations, the density can be based on a type of installation environment (e.g., an aerospace installation, a terrestrial vehicle installation, a maritime installation, and/or a stationary installation).

When the first fastener 1438A and the second fastener 1438B are in the second state, the fifth serrations 1496 engage the sixth serrations 1498 to retain the clamp assembly 1412 at the lateral position selected from among the plurality of lateral positions. More particularly, when the plurality of fasteners 1438A, 1438B are in the second state, (i) the first portion of the fifth serrations 1496 engage the first portion of the sixth serrations 1498 and (ii) the second portion of the fifth serrations 1496 engage the second portion of the sixth serrations 1498 to retain the clamp assembly 1412 at the lateral position selected from among the plurality of lateral positions. For example, when the first fastener 1438A and the second fastener 1438B are in the second state, the first fastener 1438A and the second fastener 1438B apply a force (e.g., in the third direction 1440C) to the clamp assembly 1412 and the base 1410 to lock the sixth serrations 1498 into meshing engagement with the fifth serrations 1496, which thus inhibits (or prevents) the sixth serrations 1498 from translating over the fifth serrations 1496.

As noted above, the fifth serrations 1496 and the sixth serrations 1498 can extend along the first direction 1440A, which is orthogonal to the second direction 1440B. This can enhance (or maximize) a resistance of the clamp assembly 1412 translating relative to the base 1410 in the second state, which can allow for the first fastener 1438A and the second fastener 1438B to be tightened to a lesser extent while retaining the clamp assembly 1412 at the selected lateral position. However, in other examples, the fifth serrations 1496 and the sixth serrations 1498 can extend in another direction, which is transverse to the second direction 1440B.

Within examples, by translating the clamp assembly 1412 relative to the base 1410 in the second direction 1440B when the first fastener 1438A and the second fastener 1438B are in the first state, the lateral position of the clamp assembly 1412 relative to the base 1410 can be selected from among the plurality of lateral positions defined by the fifth serrations 1496 and the sixth serrations 1498. After the clamp assembly 1412 is translated to select the lateral position, the first fastener 1438A and the second fastener 1438B can be tightened to transition from the first state to the second state and lock the clamp assembly 1412 at the selected lateral position.

Figure 15:
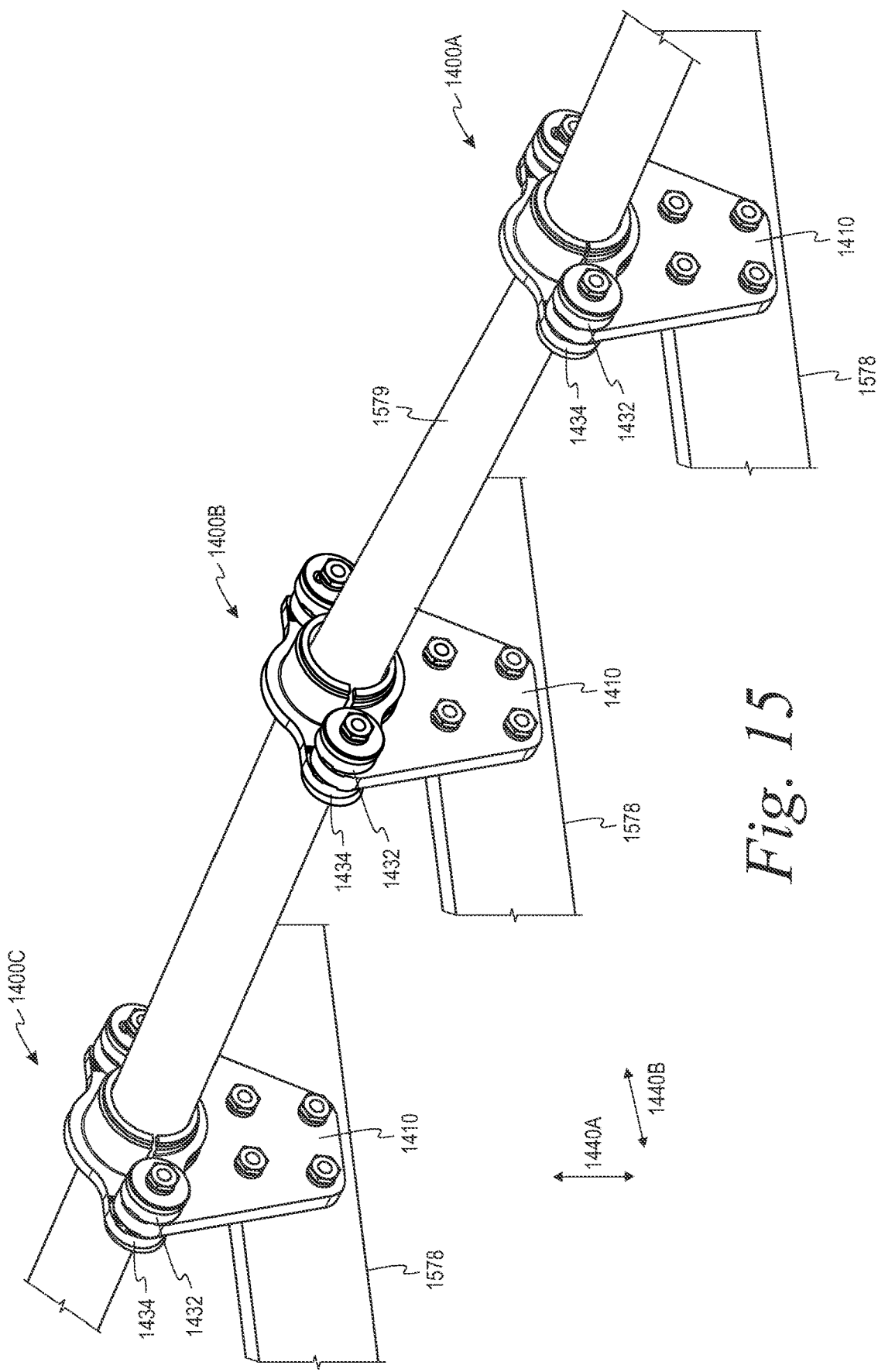
FIG. 15 illustrates a plurality of adjustable clamp systems coupling a tube to a support structure, according to another example embodiment.

FIG. 15 depicts a system 1501 including a plurality of adjustable clamp systems 1400A-1400C coupling to a tube 1579 to a support structure 1578 according to an example embodiment. The adjustable clamp systems 1400A-1400C include a first adjustable clamp system 1400A, a second adjustable clamp system 1400B, and a third adjustable clamp system 1400C. The adjustable clamp systems 1400A-1400C are identical to the adjustable clamp system 1400 described above with respect to FIGS. 14A-14G. However, one or more of the first clamping members 1432, the second clamping members 1434, and/or the bases 1410 of the first adjustable clamp system 1400A, the second adjustable clamp system 1400B, and the third adjustable clamp system 1400C are in different respective positions to accommodate variations in one or more dimensions of the tube 1579, a location of pre-drilled holes in the support structure 1578, and/or structural variations in the support structure (e.g., a non-level surface of the support structure).

For instance, in FIG. 15, the second adjustable clamp system 1400B can be vertically adjusted in the first direction 1440A and laterally adjusted in the second direction 1440B relative to the first adjustable clamp system 1400A. Additionally, for instance, the third adjustable clamp system 1400C can be adjusted to a larger bore than the second adjustable clamp system 1400B. Other examples are also possible.

As described above, the adjustable clamp systems described above with respect to FIGS. 1-15 can be adjustable in three aspects—namely, a distance between the clamp and the base, a size of the bore, and a lateral position. In other examples, the adjustable clamp systems can be adjustable in one aspect or two aspects. For instance, the adjustable clamp systems described above can be modified to be adjustable with respect to one or a combination two aspects selected from the group consisting of the distance between the clamp and the base, the size of the bore, and/or the lateral position.

Figure 16:
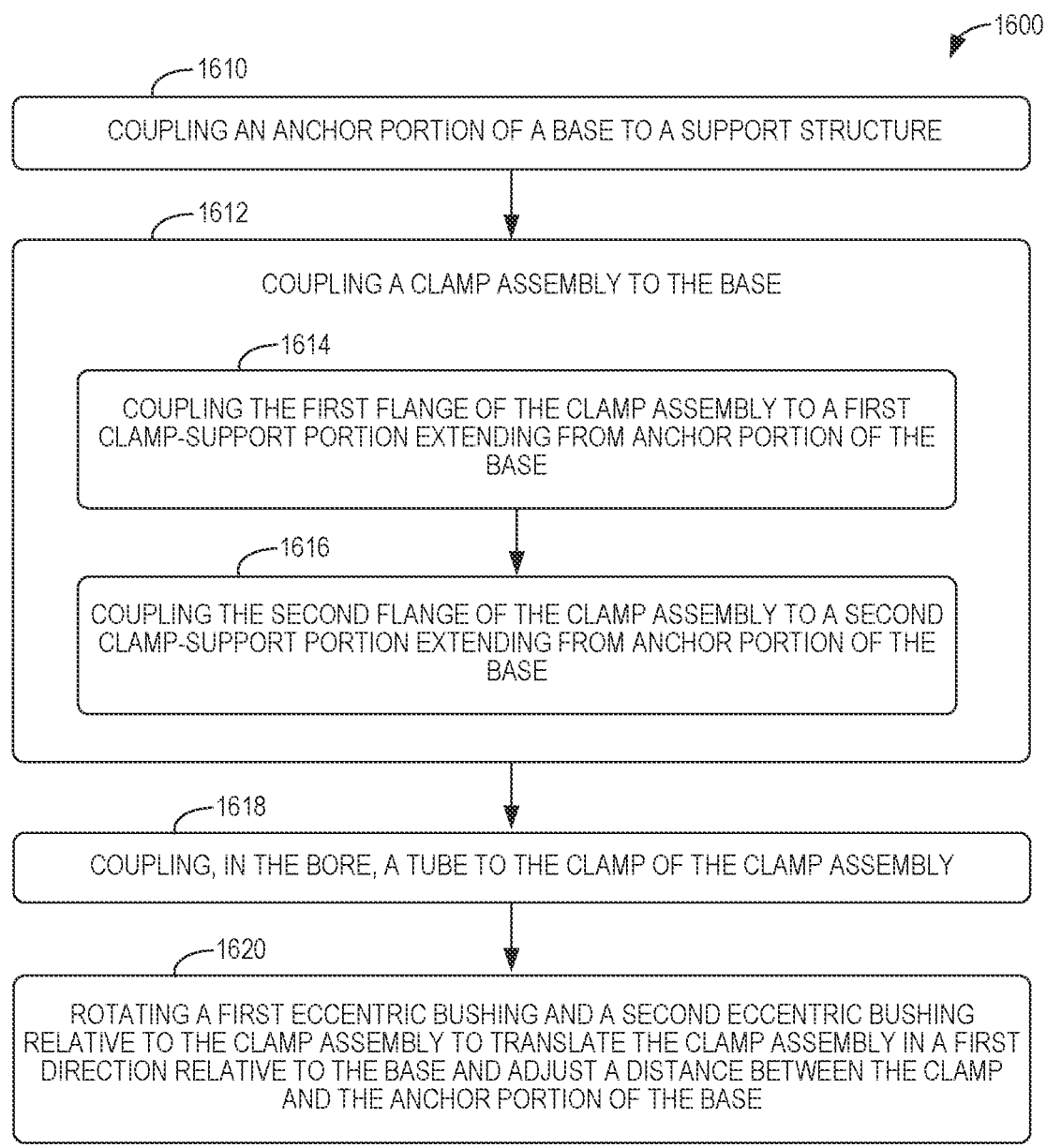
FIG. 16 illustrates a flow chart of an example process for coupling a tube to a support structure, according to an example embodiment.

Referring now to FIG. 16, a flowchart for a process 1600 of coupling a tube to a support structure is illustrated according to an example embodiment. As shown in FIG. 16, at block 1610, the process 1600 includes coupling an anchor portion of a base to a support structure. At block 1612, the process 1600 includes coupling a clamp assembly to the base. The clamp assembly includes (i) a clamp defining a bore, (ii) a first flange extending from a first side of the clamp, and (iii) a second flange extending from a second side of the clamp. To couple the clamp assembly to the base, the process 1600 can include coupling the first flange of the clamp assembly to a first clamp-support portion extending from anchor portion of the base at block 1614, and coupling the second flange of the clamp assembly to a second clamp-support portion extending from anchor portion of the base at block 1616.

At block 1618, the process 1600 can include coupling, in the bore, a tube to the clamp of the clamp assembly. At block 1620, the process 1600 can include rotating a first eccentric bushing and a second eccentric bushing relative to the clamp assembly to translate the clamp assembly in a first direction relative to the base and adjust a distance between the clamp and the anchor portion of the base.

FIGS. 17-21 depict additional aspects of the process 1600 according to further examples. In an example, the clamp assembly includes (i) a first clamping member comprising the first portion of the clamp, a first portion of the first flange, a first portion of the second flange, and a first aperture in the first portion of the first flange, and (ii) a second clamping member comprising the second portion of the clamp, a second portion of the first flange, a second portion of the second flange, and a second aperture in the second portion of the first flange.

Figure 17:
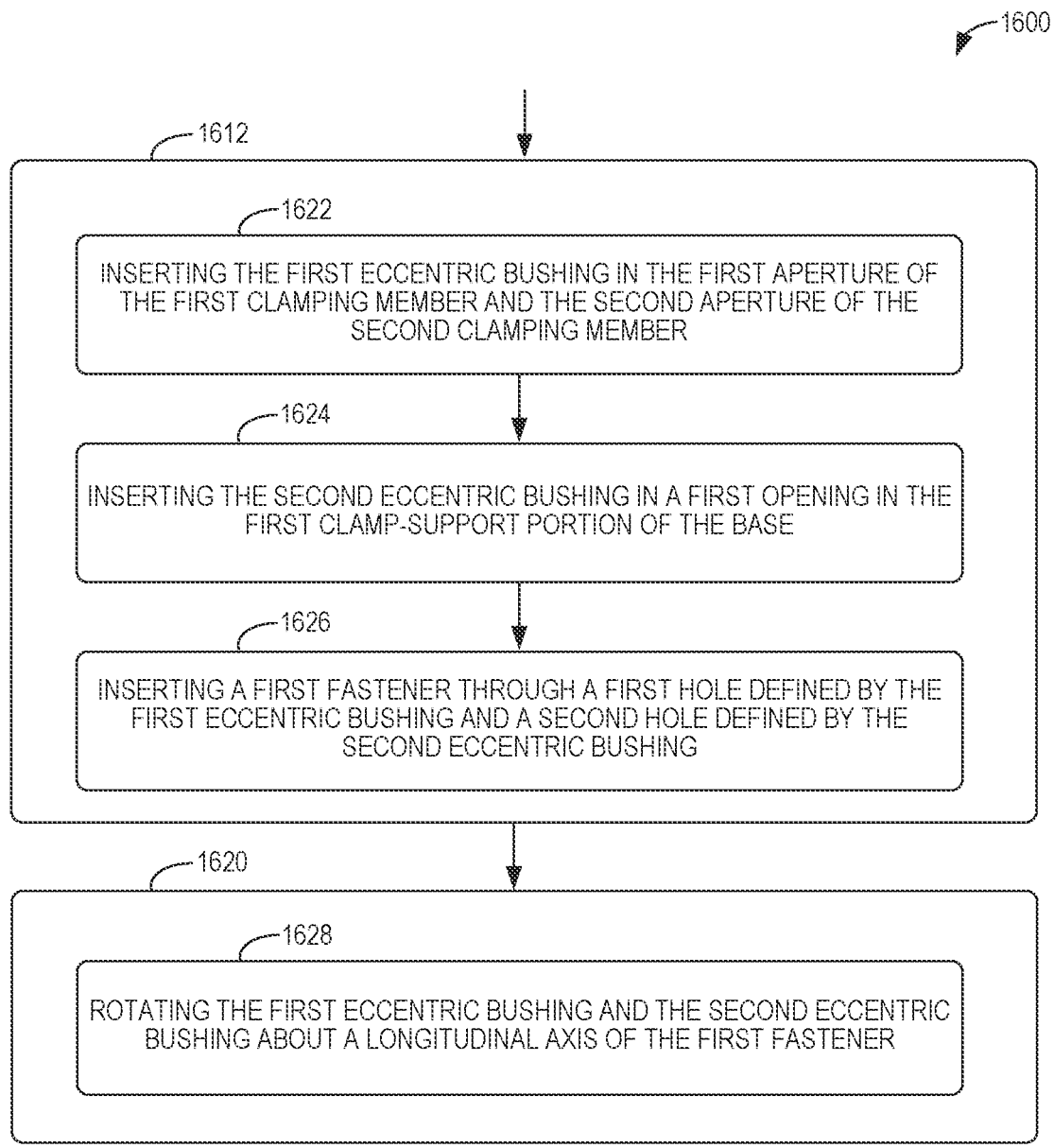
FIG. 17 illustrates a flow chart of an example process for coupling a tube to a support structure that can be used with the process shown in FIG. 16.

As shown in FIG. 17, to couple the clamp assembly to the base at block 1612, the process 1600 can include inserting the first eccentric bushing in the first aperture of the first clamping member and the second aperture of the second clamping member at block 1622, inserting the second eccentric bushing in a first opening in the first clamp-support portion of the base at block 1624, and inserting a first fastener through a first hole defined by the first eccentric bushing and a second hole defined by the second eccentric bushing at block 1626. Additionally, as shown in FIG. 17, to rotate the first eccentric bushing and the second eccentric bushing at block 1620, the process 1600 can include rotating the first eccentric bushing and the second eccentric bushing about a longitudinal axis of the first fastener at block 1628.

Figure 18:
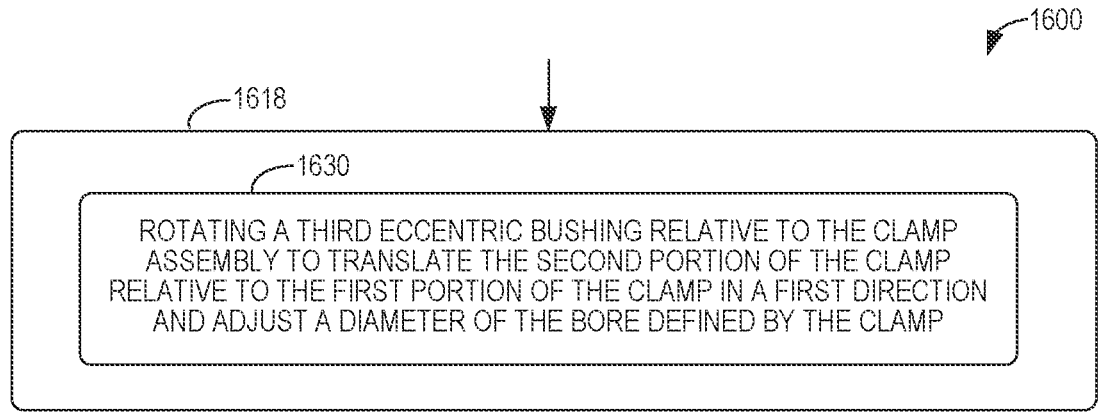
FIG. 18 illustrates a flow chart of an example process for coupling a tube to a support structure that can be used with the process shown in FIG. 16.

As shown in FIG. 18, to couple the tube to the clamp assembly at block 1618, the process 1600 can include rotating a third eccentric bushing relative to the clamp assembly to translate the second portion of the clamp relative to the first portion of the clamp in a first direction and adjust a diameter of the bore defined by the clamp at block 1630.

Figure 19:
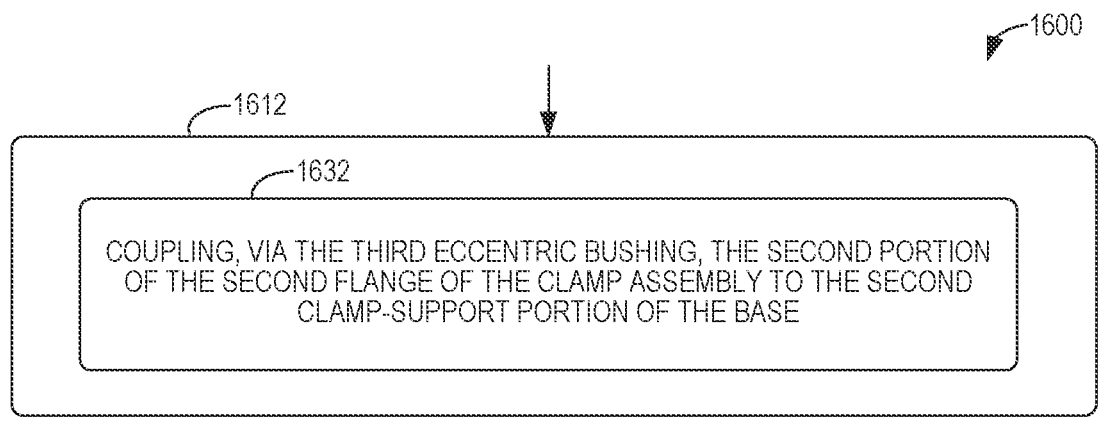
FIG. 19 illustrates a flow chart of an example process for coupling a tube to a support structure that can be used with the process shown in FIG. 16.

As shown in FIG. 19, to couple the clamp assembly to the base at block 1612, the process 1600 can include coupling, via the third eccentric bushing, the second portion of the second flange of the clamp assembly to the second clamp-support portion of the base at block 1632.

Figure 20:
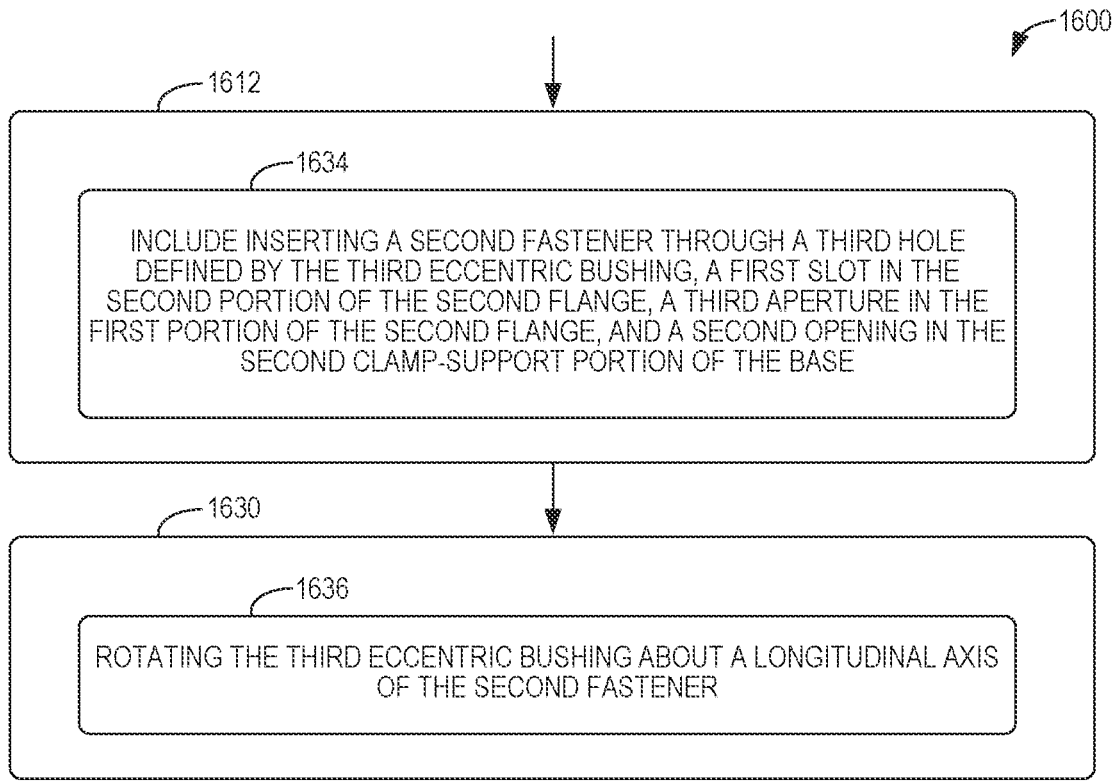
FIG. 20 illustrates a flow chart of an example process for coupling a tube to a support structure that can be used with the process shown in FIG. 19.

As shown in FIG. 20, to couple the clamp assembly to the base at block 1612, the process 1600 can also include inserting a second fastener through a third hole defined by the third eccentric bushing, a first slot in the second portion of the second flange, a third aperture in the first portion of the second flange, and a second opening in the second clamp-support portion of the base at block 1634. As also shown in FIG. 20, to rotate the third eccentric bushing at block 1630, the process 1600 can include rotating the third eccentric bushing about a longitudinal axis of the second fastener at block 1636.

Figure 21:
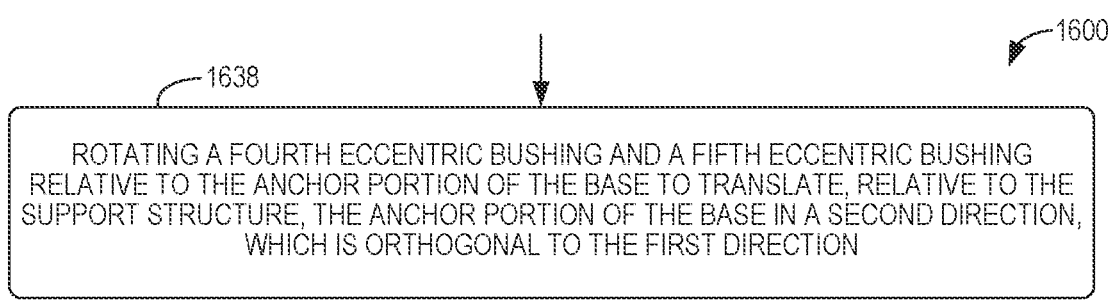
FIG. 21 illustrates a flow chart of an example process for coupling a tube to a support structure that can be used with the process shown in FIG. 16.

As shown in FIG. 21, the process 1600 can further include rotating a fourth eccentric bushing and a fifth eccentric bushing relative to the anchor portion of the base to translate, relative to the support structure, the anchor portion of the base in a second direction, which is orthogonal to the first direction at block 1638.

The description of the different advantageous arrangements has been presented for purposes of illustration and description, and is not intended to be exhaustive or limited to the embodiments in the form disclosed. Many modifications and variations will be apparent to those of ordinary skill in the art. Further, different advantageous embodiments may describe different advantages as compared to other advantageous embodiments. The embodiment or embodiments selected are chosen and described in order to explain the principles of the embodiments, the practical application, and to enable others of ordinary skill in the art to understand the disclosure for various embodiments with various modifications as are suited to the particular use contemplated.

What is claimed is:

1. An adjustable clamp system, comprising:
    a base comprising:
        an anchor portion configured to couple the base to a support structure,
        a first clamp-support portion extending from the anchor portion,
        a second clamp-support portion extending from the anchor portion, and
        a plurality of first serrations on the first clamp-support portion and the second clamp-support portion; and
    a clamp assembly comprising:
        a clamp defining a bore,
        a first flange extending from a first side of the clamp,
        a second flange extending from a second side of the clamp, and
        a plurality of second serrations on the first flange and the second flange,
    a plurality of fasteners configured to couple, in a first state and a second state, (i) the first flange of the clamp assembly to the first clamp-support portion of the base and (ii) the second flange of the clamp assembly to the second clamp-support portion of the base,
    wherein, in the first state, the clamp assembly is translatable in a first direction relative to the base to provide for selection, from among a plurality of positions, of a position of the clamp assembly relative to the base,
    wherein, in the second state, the plurality of second serrations engage the plurality of first serrations to retain the clamp assembly at the position selected from among the plurality of positions, and
    wherein the plurality of positions are defined by the plurality of first serrations and the plurality of second serrations.

2. The adjustable clamp system of claim 1, wherein the plurality of first serrations and the plurality of second serrations each extend in a second direction, which is orthogonal to the first direction.

3. The adjustable clamp system of claim 1, wherein a distance between adjacent positions of the plurality of positions is defined by a size of each first serration and a size of each second serration.

4. The adjustable clamp system of claim 1, further comprising:
    a first slot in the first flange; and
    a second slot in the second flange,
    wherein the first slot and the second slot each have a longitudinal axis that extends in the first direction,
    wherein the plurality of fasteners comprise:
        a first fastener extending through the first slot to couple the first flange of the clamp assembly to the first clamp-support portion of the base, and
        a second fastener extending through the second slot to couple the second flange of the clamp assembly to the second clamp-support portion of the base, and
    wherein, in the first state, (i) the first fastener is translatable in the first slot in the first direction and (ii) the second fastener is translatable in the second slot in the first direction.

5. The adjustable clamp system of claim 1, wherein the clamp assembly comprises:
    a first clamping member comprising a first portion of the first flange, a first portion of the clamp, and a first portion of the second flange; and
    a second clamping member comprising a second portion of the first flange, a second portion of the clamp, and a second portion of the second flange.

6. The adjustable clamp system of claim 5, wherein the first portion of the clamp comprises a bottom half of the clamp and the second portion of the clamp comprises a top half of the clamp.

7. The adjustable clamp system of claim 5, wherein the first clamping member comprises the plurality of second serrations on a first side of the first clamping member and a plurality of third serrations on a second side of the first clamping member,
    wherein the second clamping member comprises a plurality of fourth serrations on a first face of the second clamping member, wherein the first face of the second clamping member faces the second side of the first clamping member,
    wherein, when the plurality of fasteners are in the first state, the first clamping member is translatable relative to the second clamping member to select, from among a plurality of sizes, a size of the bore of the clamp, and
    wherein, when the plurality of fasteners are in the second state, the plurality of third serrations engage the plurality of fourth serrations to lock the bore at the size selected from among the plurality of sizes.

8. The adjustable clamp system of claim 5, wherein the plurality of first serrations are on a first side of the base and a plurality of third serrations are on a second side of the base,
    wherein the first clamping member comprises the plurality of second serrations and the second clamping member comprises a plurality of fourth serrations,
    wherein the first clamping member is coupled to the first side of the base, and
    wherein the second clamping member is coupled to the second side of the base.

9. The adjustable clamp system of claim 8, wherein, when the plurality of fasteners are in the first state, the second clamping member is translatable relative to the first clamping member to select, from among a plurality of sizes, a size of the bore of the clamp, and
    wherein, when the plurality of fasteners are in the second state, (i) the plurality of first serrations engage the plurality of second serrations and (ii) the plurality of third serrations engage the plurality of fourth serrations to lock the bore at the size selected from among the plurality of sizes.

10. The adjustable clamp system of claim 8, further comprising:
    a plurality of fifth serrations on the first clamp-support portion and the second clamp-support portion of the base; and a plurality of sixth serrations on the first flange and the second flange of the clamp assembly,
wherein the plurality of fifth serrations and the plurality of sixth serrations extend in the first direction, and
wherein the plurality of first serrations and the plurality of second serrations extend in a second direction, which is orthogonal to the first direction.

11. The adjustable clamp system of claim 10, wherein, in the first state of the plurality of fasteners, the clamp assembly is translatable in the second direction relative to the base to select, from among a plurality of lateral positions, a lateral position of the clamp assembly relative to the base,
wherein, in the second state, the plurality of fifth serrations engage the plurality of sixth serrations to retain the clamp assembly at the lateral position selected from among the plurality of lateral positions, and
wherein the plurality of lateral positions are defined by the plurality of fifth serrations and the plurality of sixth serrations.

12. The adjustable clamp system of claim 11, wherein the first clamping member comprises a first portion of the plurality of sixth serrations and the second clamping member comprises a second portion of the plurality of sixth serrations,
wherein a first portion of the plurality of fifth serrations are on a first side of the base and a second portion of the plurality of fifth serrations are on a second side of the base, and
wherein the first clamping member is coupled to the first side of the base,
wherein the second clamping member is coupled to the second side of the base, and
wherein, when the plurality of fasteners are in the second state, (i) the first portion of the plurality of fifth serrations engage the first portion of the plurality of sixth serrations and (ii) the second portion of the plurality of fifth serrations engage the second portion of the plurality of sixth serrations to retain the clamp assembly at the lateral position selected from among the plurality of lateral positions.

13. The adjustable clamp system of claim 1, wherein the anchor portion of the base is coplanar with the first clamp-support portion and the second clamp-support portion of the base.

14. The adjustable clamp system of claim 1, further comprising:
a plurality of fifth serrations on the anchor portion of the base;
a base plate comprising a plurality of sixth serrations; and
a plurality of base fasteners configured to couple, in a first state and a second state, the anchor portion of the base to the base plate,
wherein, in the first state of the plurality of base fasteners, the base is translatable in a second direction relative to the base plate to select, from among a plurality of base positions, a position of the base relative to the base plate,
wherein, in the second state, the plurality of fifth serrations engage the plurality of sixth serrations to retain the base at the position selected from among the plurality of base positions, and
wherein the plurality of base positions are defined by the plurality of fifth serrations and the plurality of sixth serrations.

15. The adjustable clamp system of claim 14, wherein the anchor portion comprises a third slot and a fourth slot,
wherein the third slot and the fourth slot each have a longitudinal axis extending in the second direction,
wherein the plurality of base fasteners comprise a third fastener extending through the third slot and a fourth fastener extending through the fourth slot,
wherein, in the first state of the plurality of base fasteners, (i) the third fastener is translatable in the third slot in the second direction and (ii) the fourth fastener is translatable in the fourth slot in the second direction, and
wherein the plurality of fifth serrations and the plurality of sixth serrations each extend in a third direction, which is orthogonal to the second direction.

16. A method of coupling a tube to a support structure, comprising:
coupling an anchor portion of a base to a support structure, wherein the base further comprises:
a first clamp-support portion extending from the anchor portion,
a second clamp-support portion extending from the anchor portion, and
a plurality of first serrations on the first clamp-support portion and the second clamp-support portion;
coupling a clamp assembly to the base using a plurality of fasteners in a first state, wherein the clamp assembly comprises:
a clamp defining a bore,
a first flange extending from a first side of the clamp,
a second flange extending from a second side of the clamp, and
a plurality of second serrations on the first flange and the second flange,
translating, while the plurality of fasteners are in the first state, the clamp assembly in a first direction relative to the base to provide for selection, from among a plurality of positions, of a position of the clamp assembly relative to the base, wherein the plurality of positions are defined by the plurality of first serrations and the plurality of second serrations;
transitioning the plurality of fasteners from the first state to a second state, wherein, in the second state, the plurality of second serrations engage the plurality of first serrations to retain the clamp assembly at the position selected from among the plurality of positions; and
coupling, in the bore, a tube to the clamp of the clamp assembly,
wherein, in the first state and the second state, (i) the first flange of the clamp assembly to the first clamp-support portion of the base and (ii) the second flange of the clamp assembly to the second clamp-support portion of the base.

17. The method of claim 16, wherein the plurality of first serrations and the plurality of second serrations each extend in a second direction, which is orthogonal to the first direction.

18. The method of claim 16, wherein a distance between adjacent positions of the plurality of positions is defined by a size of each first serration and a size of each second serration.

19. The method of claim 16, wherein the first flange comprises a first slot and the second flange comprises a second slot,
wherein the first slot and the second slot each have a longitudinal axis that extends in the first direction,
wherein coupling a clamp assembly to the base using a plurality of fasteners in a first state comprises:

inserting a first fastener through the first slot to couple the first flange of the clamp assembly to the first clamp-support portion of the base, and inserting a second fastener through the second slot to couple the second flange of the clamp assembly to the second clamp-support portion of the base, and wherein translating, while the plurality of fasteners are in the first state, the clamp assembly in the first direction relative to the base comprises:

translating the first fastener is in the first slot in the first direction, and translating the second fastener is in the second slot in the first direction.

20. The method of claim 16, wherein the clamp assembly comprises (i) a first clamping member comprising a first portion of the first flange, a first portion of the clamp, and a first portion of the second flange, and (ii) a second clamping member comprising a second portion of the first flange, a second portion of the clamp, and a second portion of the second flange, wherein the first clamping member comprises the plurality of second serrations on a first side of the first clamping member and a plurality of third serrations on a second side of the first clamping member, wherein the second clamping member comprises a plurality of fourth serrations on a first face of the second clamping member, wherein the first face of the second clamping member faces the second side of the first clamping member, wherein the method further comprises, when the plurality of fasteners are in the first state, translating the first clamping member relative to the second clamping member to select, from among a plurality of sizes, a size of the bore of the clamp, and wherein, when the plurality of fasteners are in the second state, the plurality of third serrations engage the plurality of fourth serrations to lock the bore at the size selected from among the plurality of sizes.

* * * * *